United States Patent [19]
Ashburn

[11] Patent Number: 5,651,106
[45] Date of Patent: Jul. 22, 1997

[54] METHOD AND APPARATUS FOR VERTEX SORTING IN A COMPUTER GRAPHICS SYSTEM

[75] Inventor: Jon L. Ashburn, Fort Collins, Colo.

[73] Assignee: Hewlett-Packard Company, Palo Alto, Calif.

[21] Appl. No.: 488,474

[22] Filed: Jun. 8, 1995

[51] Int. Cl.⁶ ............................................. G06F 15/00

[52] U.S. Cl. ............................................. 395/141

[58] Field of Search ........................ 395/143, 141, 395/140, 142; 345/118

[56] References Cited

U.S. PATENT DOCUMENTS

| | | | |
|---|---|---|---|
| 5,129,051 | 7/1992 | Cain | 395/133 |
| 5,142,617 | 8/1992 | Dalrymple et al. | 395/132 |
| 5,528,737 | 6/1996 | Sfarti | 395/141 |

*Primary Examiner*—Phu K. Nguyen

[57] ABSTRACT

A quadrilateral is divided into two triangles so that each of the two triangles may then be filled by a triangle fill scan converter. Additionally, the vertices of a triangle are sorted to generate inputs to a fill scan converter. A circuit combines the functions of dividing the quadrilateral into triangles and generating the plane equations for the triangle fill scan converter. Accordingly, similar operations which are performed for both triangles of the quadrilateral may be shared between the plane equations for the two triangles. A circuit also combines the functions of generating the plane equations for any one triangle with automatic sorting of the triangle vertices.

20 Claims, 18 Drawing Sheets

FIG 11

| FIRST TRIANGLE | | SECOND TRIANGLE | |
|---|---|---|---|
| FETCH | CALCULATE | FETCH | CALCULATE |
| ny1 | | dxe3 | 1.0/(temp-temp2),v0.z-v2.z |
| mnx2 | v0.red-v2.red | v1.y | nz1*mny2,temp3-temp4 |
| mny2 | v1.red-v0.red | | temp3=nred1*mny2, |
| nx1 | ny1*mnred2, v0.green-v2.green | | temp4=ny1*mnred2 |
| v0.z | ny1 *mnx2, v1.green-v0.green | | REST OF PLANE EQUATIONS... |
| v1.z | ny1*mngreen2, v0.blue-v0.blue | | |
| v2.z | nx1*mny2,v1.blue-v0.blue | | |
| v0.y | nred1 * mny2 | | |
| dye3 | ngreen1*mny2,temp-temp2 | | |
| dxe3 | temp+nx1*mny2,temp2=ny1*mnx2 | | |
| v1.y | ny1*mnblue2,v1.z-v0.z | | |
| | 1.0/(temp-temp2),v0.z-v2.z | | |
| | nz1*mny2,temp3-temp4 | | |
| | temp3=nred1*mny2, | | |
| | temp4=ny1*mnred2 | | |
| | REST OF PLANE EQUATIONS... | | |

| CASE | TRIANGLE (FIG 12) | edge 3 DY sign | edge 2 DY sign | edge 1 DY sign | SORTED VERTEX ORDER | SORTED EDGE ORDER | COMMENTS |
|---|---|---|---|---|---|---|---|
| (a) | 201 | 0 | 0 | 1 | 0,1,2 | 1,2,3 | NULL SORT |
| (b) | 202 | 0 | 1 | 0 | 2,0,1 | 3,1,2 | CLOCKWISE |
| (c) | 203 | 0 | 1 | 1 | 1,0,2 | 3,2,1 | SWAP 0,1 |
| (d) | 204 | 1 | 0 | 0 | 1,2,0 | 2,3,1 | COUNTER-CLOCKWISE |
| (e) | 205 | 1 | 0 | 1 | 0,2,1 | 2,1,3 | SWAP 1,2 |
| (f) | 206 | 1 | 1 | 0 | 2,1,0 | 1,3,2 | SWAP 0,2 |
| (g) | — | 0 | 1 | 1 | XXX | XXX | * |
| (h) | — | 1 | 1 | 1 | XXX | XXX | * |

| LABEL | ADDRESS | ADDRESS (BINARY) | CONTENT |
|---|---|---|---|
| VERTEX V0 | 8 | 01000 | X |
| | 9 | 01001 | Y |
| | 10 | 01010 | Z |
| | 11 | 01011 | R |
| | 12 | 01100 | G |
| | 13 | 01101 | B |
| | 14 | 01110 | edge1_dx |
| | 15 | 01111 | edge1_dy |
| VERTEX V1 | 16 | 10000 | X |
| | 17 | 10001 | Y |
| | 18 | 10010 | Z |
| | 19 | 10011 | R |
| | 20 | 10100 | G |
| | 21 | 10101 | B |
| | 22 | 10110 | edge2_dx |
| | 23 | 10111 | edge2_dy |
| VERTEX V2 | 24 | 11000 | X |
| | 25 | 11001 | Y |
| | 26 | 11010 | Z |
| | 27 | 11011 | R |
| | 28 | 11100 | G |
| | 29 | 11101 | B |
| | 30 | 11110 | edge3_dx |
| | 31 | 11111 | edge3_dy |

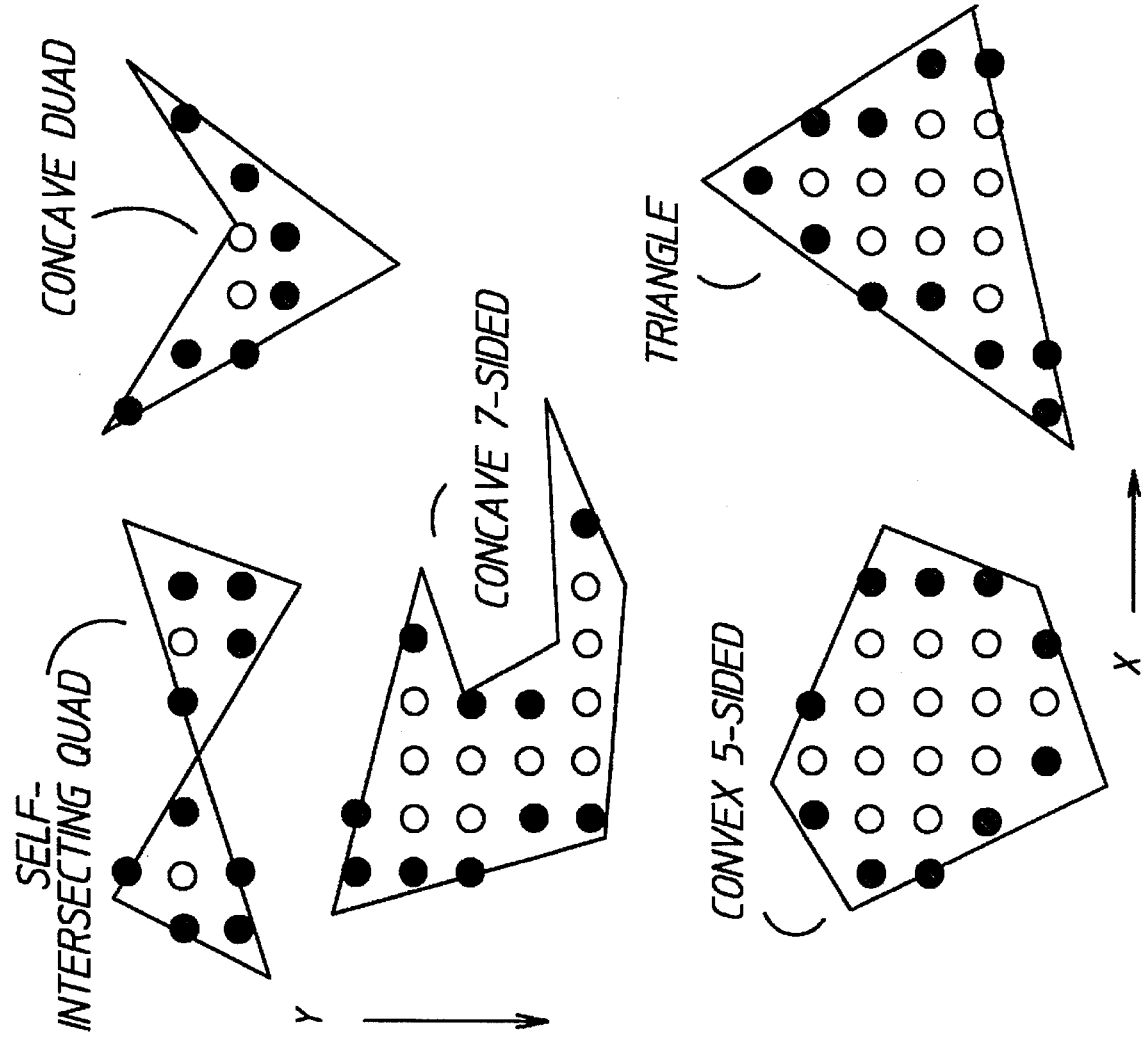

METHOD AND APPARATUS FOR VERTEX SORTING IN A COMPUTER GRAPHICS SYSTEM

FIELD OF THE INVENTION

This invention relates generally to display graphics generation, and more particularly to the generation of triangle plane equations for input to a fill scan converter.

BACKGROUND OF THE INVENTION

Polygons are one of the basic primitives used in graphics to display surfaces on a display screen. Filled areas of polygons are especially useful in rendering surfaces of three-dimensional objects in a graphics display. In general, polygons are defined as a closed series of connected lines that may have any shape, either convex or concave. They can be filled on a display screen by activating the pixels of the display which fall on and inside the edges of a polygon. The pixels inside the edges are called interior pixels. FIG. 17 illustrates several polygons and the pixels activated to render the filled polygons.

Several techniques are used to determine which pixels should be activated to fill a polygon. These techniques are referred to as fill scan conversions. Generally, these techniques operate between a set of edges on a span, where a span is either a horizontal or a vertical row of pixels. In FIG. 17 for example, the beginning and the end of each horizontal span for each polygon are marked by darker shaded pixels. A fill scan converter may generate the pixel data within a span incrementally by stepping from pixel to pixel, for example in the X direction in FIG. 17 and calculating parameter values for each pixel. A new span may then be selected for pixel generation by stepping down one pixel row in the Y direction, and repeating the pixel-to-pixel stepping for the new span.

As may be seen from FIG. 17, the polygons may be complex. For complex polygons, such as many-sided, self-intersecting, and concave polygons, the scan conversion may be very complicated. Therefore, it may be desirable to optimize a fill scan converter to fill triangles, and then render the polygons as combinations of triangles. Additionally, since quadrilaterals are commonly found in graphic databases, it may be desirable to optimize the fill scan converter to support a quadrilateral that has been divided into two triangles. The triangle fill scan converter can then fill both of the resulting triangles.

Although FIG. 17 is depicted in two dimensions and a single color, polygons may also have color, for example as defined by red, green, and blue color values. A polygon may be three-dimensional, and therefore will have a depth associated with each pixel, normally defined as a coordinate on a Z-axis. Accordingly, the individual pixels shown in FIG. 17 may actually have an X coordinate and a Y coordinate, as well as red, green, blue, and Z-axis coordinates.

Hardware and software designed for efficient display of triangles may be divided into a number of blocks, for example a geometry accelerator block and a fill scan converter block. In such an arrangement, the geometry accelerator generates plane equations from the data for the vertices (V0, V1, V2) of a triangle. These plane equations, which uniquely define the values of the parameters associated with each pixel in a triangle, may be designed so that The fill scan converter is simple high-speed electronic hardware, which generates the pixels by "stepping" the plane equations provided by the geometry accelerator. For example, the geometry accelerator may perform additions, multiplications, and divisions, while the fill scan converter performs only additions.

When a quadrilateral is to be generated and filled, it can be divided into two separate triangles, and then the data for each triangle may be input separately to the geometry accelerator to generate the appropriate plane equations. However, this approach can use a substantial amount of processing resources, and may require lengthy calculations. It is desirable to reduce the processing resources and time required for filling a quadrilateral.

Moreover, a fill scan converter may be designed to be more efficient if provided with triangle information that is sorted with respect to vertex designation. Although sorting of vertices may be performed prior to plane equation generation, this approach uses additional processing resources and time. It is therefore desirable to reduce the processing resources and time required in generating plane equations with sorted triangle vertices.

SUMMARY OF THE INVENTION

One embodiment of the invention is directed to a computer graphic system apparatus for generating pixel data representative of a triangle, comprising a processing circuit for generating plane equation data in response to vertex data representative of a triangle, and a fill scan converter responsive to the processing circuit of the plane equation data for generating pixel data representative of the triangle. The processing circuit comprises means responsive to the vertex data for generating a first portion of the plane equation data, means for sorting the vertex data in accordance with a sorting criteria that facilitates calculations of the plane equation data to provide sorted vertex data, the first portion of the plane equation being generated concurrently with sorting of the vertex data, and means responsive to the sorted vertex data for generating a second portion of the plane equation data following sorting of the vertex data. The fill scan converter may generate pixel data for a display that includes a first axis and a second axis, and the first portion of the plane equation data may include a first edge delta representing a difference in first axis coordinate values along a first edge of the triangle, the first edge delta having a first sign, a second edge delta representing a difference in first axis coordinate values along a second edge of the triangle, the second edge delta having a second sign, and a third edge delta representing a difference in first axis coordinate values along a third edge of the triangle, the third edge delta having a third sign. The means for sorting may include a logic circuit that determines the sorted vertex data from the first sign, the second sign, and the third sign. The processing circuit may include a register file that stores the vertex data, and the logic circuit may provide sorted addresses that reference the vertex data stored in the register file. Furthermore, the means for sorting may include means for determining the sorted vertex data from the first sign, the second sign, and the third sign. The sorted addresses may include a first part that references a display parameter of one of the vertices, and a second part that references the sorted vertex.

Another embodiment is directed to a method for generating plane equation data representative of a triangle to be provided to a fill scan converter, the method comprising the steps of receiving vertex data that describes the triangle, generating a first portion of the plane equation data, the first portion of the plane equation data being independent of whether the vertex data is sorted, sorting the vertex data to generate sorted vertex data, generating a second portion of the plane equation data using the sorted vertex data, and providing the first portion and the second portion of the plane equation data to the fill scan converter.

Another embodiment is directed to an apparatus for generating plane equation data representative of a triangle to be provided to a fill scan converter, the apparatus comprising means for receiving vertex data that describes the triangle, means for generating a first portion of the plane equation data, the first portion of the plane equation data being independent of whether the vertex data is sorted, means for sorting the vertex data to generate sorted vertex data, means for generating a second portion of the plane equation data using the sorted vertex data, and means for providing the first portion and the second portion of the plane equation data to the fill scan converter.

BRIEF DESCRIPTION OF THE DRAWINGS

Other features and advantages of the present invention shall appear from the following description of an exemplary embodiment, this description being made with reference to the appended drawings, of which:

FIG. 9a shows naming conventions of the edges and vertices of the quadrilateral shown in FIG. 8a;

FIG. 11 is a chart illustrating fetch and calculate operations associated with the steps of FIG. 10, which shows the elimination of some fetch and calculate operations;

FIG. 13 illustrates the vertex sorting which may be performed on the triangles shown in FIG. 12;

FIG. 16 is a memory map for vertex data within the register file of FIG. 3; and

FIG. 17 shows several polygons and the pixels activated in order to fill the polygons.

DETAILED DESCRIPTION

Figure 1:
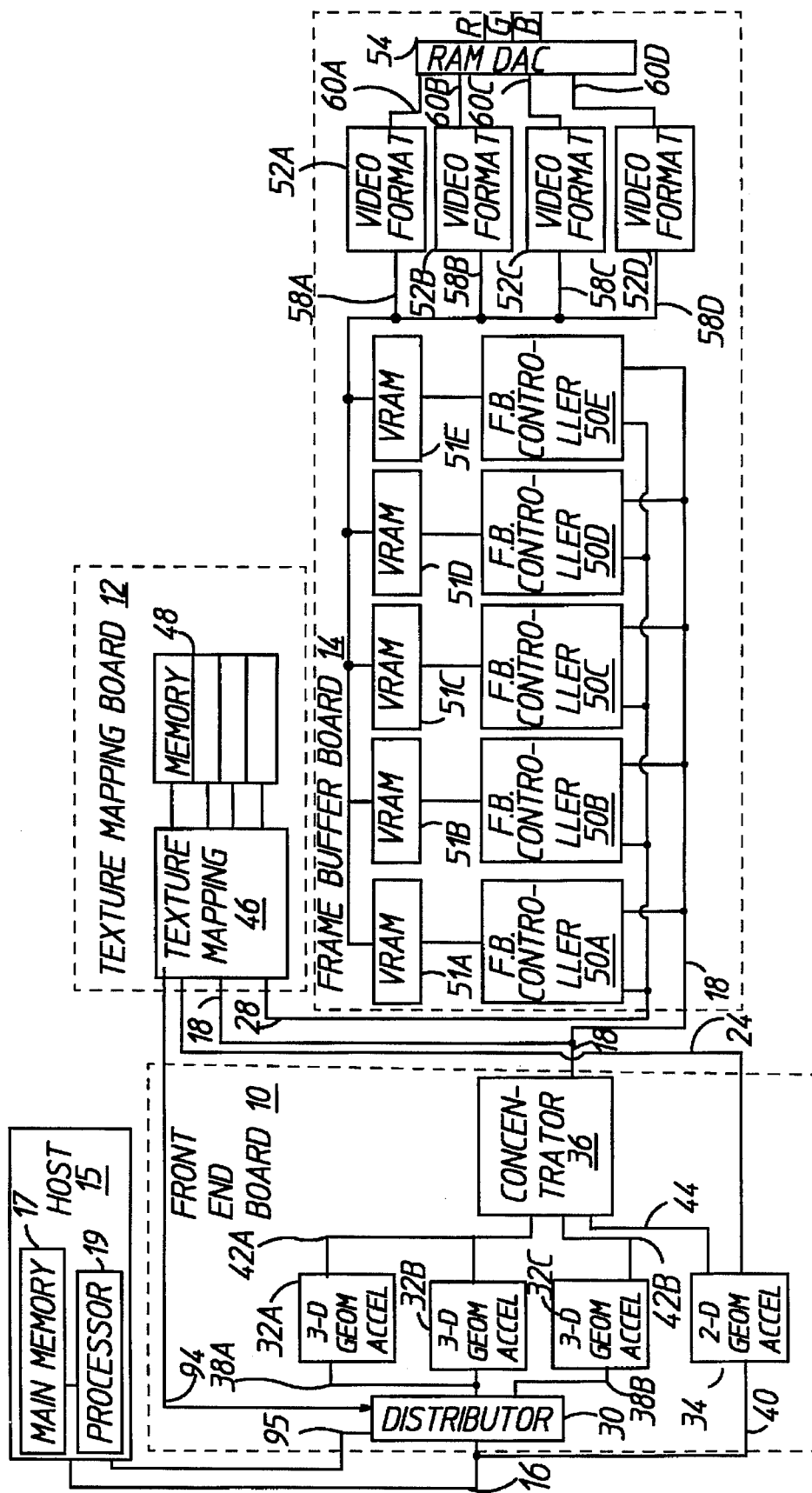
FIG. 1 is a block diagram of a first embodiment of a computer graphics system incorporating the present invention.

FIG. 1 is a block diagram of one embodiment of a graphics system suitable for incorporation of line scan conversion preprocessing in accordance with the present invention. It should be understood that the illustrative implementation shown is merely exemplary with respect to the number of boards and chips, the manner in which they are partitioned, the bus widths, and the data transfer rates. Numerous other implementations can be employed. The circuitry shown and described herein is given by way of example only. The circuitry is preferably implemented in a large scale custom integrated circuit using logic synthesis software that is commercially available, for example, from Synopsys. The logic synthesis software optimizes and translates circuit descriptions written in high level languages, such as Veralog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits. Since the input to the logic synthesis software is functional rather than structural, actual circuits generated by the logic synthesis software may differ from those disclosed herein.

As shown, the system includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by x,y,z vector coordinate data, R,G,B color data and texture S,T coordinates, all for portions of the primitives, such as for the vertices when the primitive is a triangle. Data representing the primitives in three dimensions then is provided by the front end board 10 to the texture mapping board 12 and the frame buffer board 14 over 85-bit bus 18. The texture mapping board interpolates the primitive data received to compute the screen display pixels that will represent the primitive, and determines corresponding resultant texture data for each primitive pixel. The resultant texture data is provided to the frame buffer board over five 55-bit buses 28, which are shown in FIG. 1 as a single bus to clarify the figure.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 includes a distributor chip 30, three three-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the x,y,z coordinates that define the primitives received into corresponding screen space coordinates, determines object R,G,B values and texture S,T values for the screen space coordinates, decomposes primitive quadrilaterals into triangles, computes a triangle plane equation to define each triangle, and computes light source calculations to determine R,G,B values. Each 3-D geometry accelerator chip also performs view clipping operations to ensure an accurate screen display of the resulting image when multiple windows are displayed, or when a portion of a primitive extends beyond the view volume represented on the display screen. Output data from the 3-D geometry accelerator chips 32A and 32B, and 32C respectively is provided over 44-bit buses 42A and 42B to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. As described in greater detail below, the cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include points, lines and triangles. The texture mapping board does not perform texture mapping of points or lines, and operates only upon triangle primitives. The data representing the triangle primitives includes the x,y,z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the x,y pixel coordinates and interpolates S and T coordinates that correspond to each x,y screen display pixel that represents the primitive. For each pixel, the texture mapping chip accesses the portion of the texture MIP map that corresponds thereto from the cache memory, and computes resultant texture data for the pixel, which may include a weighted average of multiple texels.

In one exemplary embodiment, the cache stores sixty-four blocks of 256×256 texels. Unlike the local memory employed in the texture mapping hardware of prior art systems, the cache memory of the present invention may not store the entire series of MIP maps of the texture that maps to the primitive being rendered, such as for large textures. Rather, the cache memory stores at any one time only the particular portions of the series of MIP maps actually used in currently rendering the primitive. Therefore, for most applications, only a portion of the complete texture data for the image being rendered will be stored in the cache memory at any one time.

The complete series of MIP maps for each texture is arranged and stored in the main memory 17 of the host computer 15. For each pixel of the primitive being rendered, the texture mapping chip 46 accesses a directory of the cache memory 48 to determine whether the corresponding texel or texels of the texture MIP maps are currently present in the cache. If the corresponding texels are stored in the cache memory at the time of the access, a cache hit occurs, and the texels are read from the cache and operated upon by the texture mapping chip 46 to compute the resultant texture data which is passed to the frame buffer board. However, if the corresponding texels for the primitive pixel are not stored in the cache memory when accessed by the texture mapping chip 46, a cache miss occurs. When a cache miss occurs, the portion of the texture MIP map data needed to render the primitive is downloaded from the main memory 17 of the host computer 15 into the cache memory 48, possibly replacing some data previously stored therein. However, unlike conventional texture mapping systems that download the entire series of MIP maps for any primitive being rendered, the present invention downloads only the portion of the series of MIP maps actually needed to currently render the primitive or the currently rendered portion thereof. As is explained in greater detail below, when a cache miss occurs, an interrupt control signal is generated by the texture mapping chip 46 to initiate a texture interrupt manager in the host computer 15. The interrupt control signal is provided over line 94 to the distributor chip 30, which in turn provides an interrupt signal over line 95 to the host computer.

The requested texture data is retrieved by the host computer from its main memory and is downloaded to the texture mapping board 48 over bus 24, bypassing the 3-D primitive rendering pipeline through the front end board and the texture mapping chip. Thus, when a cache miss interrupt occurs, the front end board can continue to operate upon 3-D primitives and provide output primitive data over bus 18 to the texture mapping chip and the frame buffer board, while the texture data associated with a primitive that caused the cache miss is being downloaded from main memory 17. In contrast to conventional texture mapping systems, the downloading of texture data to the texture mapping hardware does not require a flushing of the 3-D primitive pipeline, thereby increasing the bandwidth and performance of the system. The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel.

The frame buffer controller chips 50A–E are respectively coupled to groups of associated VRAM (video random access memory) chips 51A–E. The frame buffer board further includes four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen.

The manner in which the object and texture color values are combined can be controlled in a number of different ways. For example, in a replace mode, the object color values can be simply replaced by the texture color values, so that only the texture color values are used in rendering the pixel. Alteratively, in a modulate mode, the object and texture color values can be multiplied together to generate the final R,G,B values for the pixel. Furthermore, a color control word can be stored for each texel that specifies a ratio defining the manner in which the corresponding texture color values are to be combined with the object color values. A resultant color control word can be determined for the resultant texel data corresponding to each pixel and provided to the frame buffer controller chips over bus 28 so that the controller chips can use the ratio specified by the corresponding resultant control word to determine the final R,G,B values for each pixel.

The resulting image video data generated by the frame buffer controller chips 50A–E, including R,G,B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set often VRAM chips. The video data is serially shifted out of the VRAM chips and is respectively provided over 64-bit buses 58A, 58B, 58C, and 58D to the four video format chips 52A, 52B, 52C and 52D at a rate of 33 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

Figure 1A:
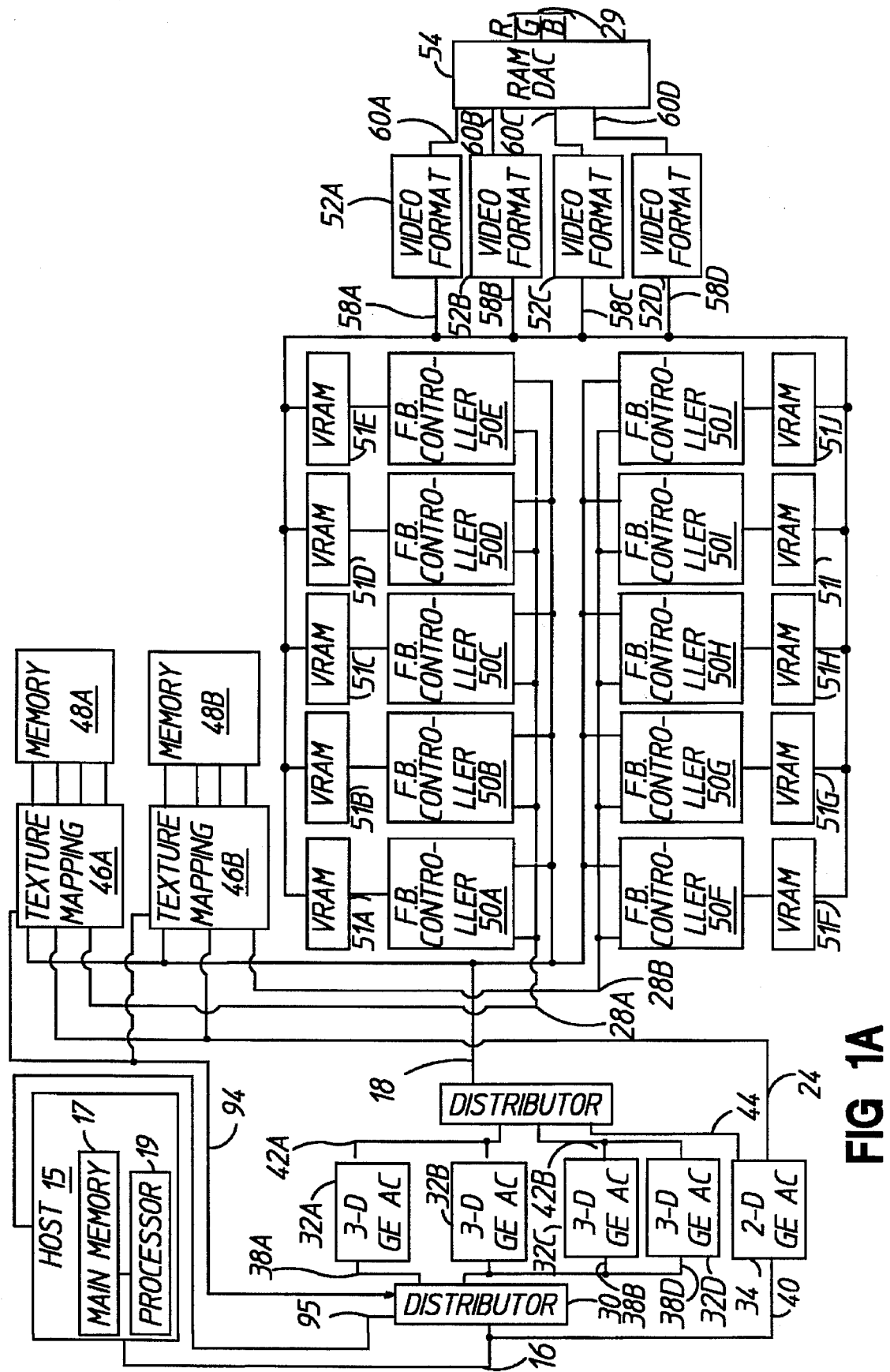
FIG. 1A is a block diagram of a second embodiment of a computer graphics system incorporating the present invention.

In one embodiment of the invention, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 1A, which is a block diagram of a computer graphics system of the present invention having certain hardware replicated. The system of FIG. 1A includes four 3-D geometry accelerator chips 32A, 32B, 32C and 32D, two texture mapping chips 46A and 46B respectively associated with cache memories 48A and 48B, and ten frame buffer chips 50A–50J, each with an associated group of VRAM chips. The operation of the system of FIG. 1A is similar to that of the system of FIG. 1, described above. The replication of the hardware in the embodiment of FIG. 1A allows for increased system bandwidth because certain primitive rendering operations can be performed in parallel on multiple primitives.

Figure 2:
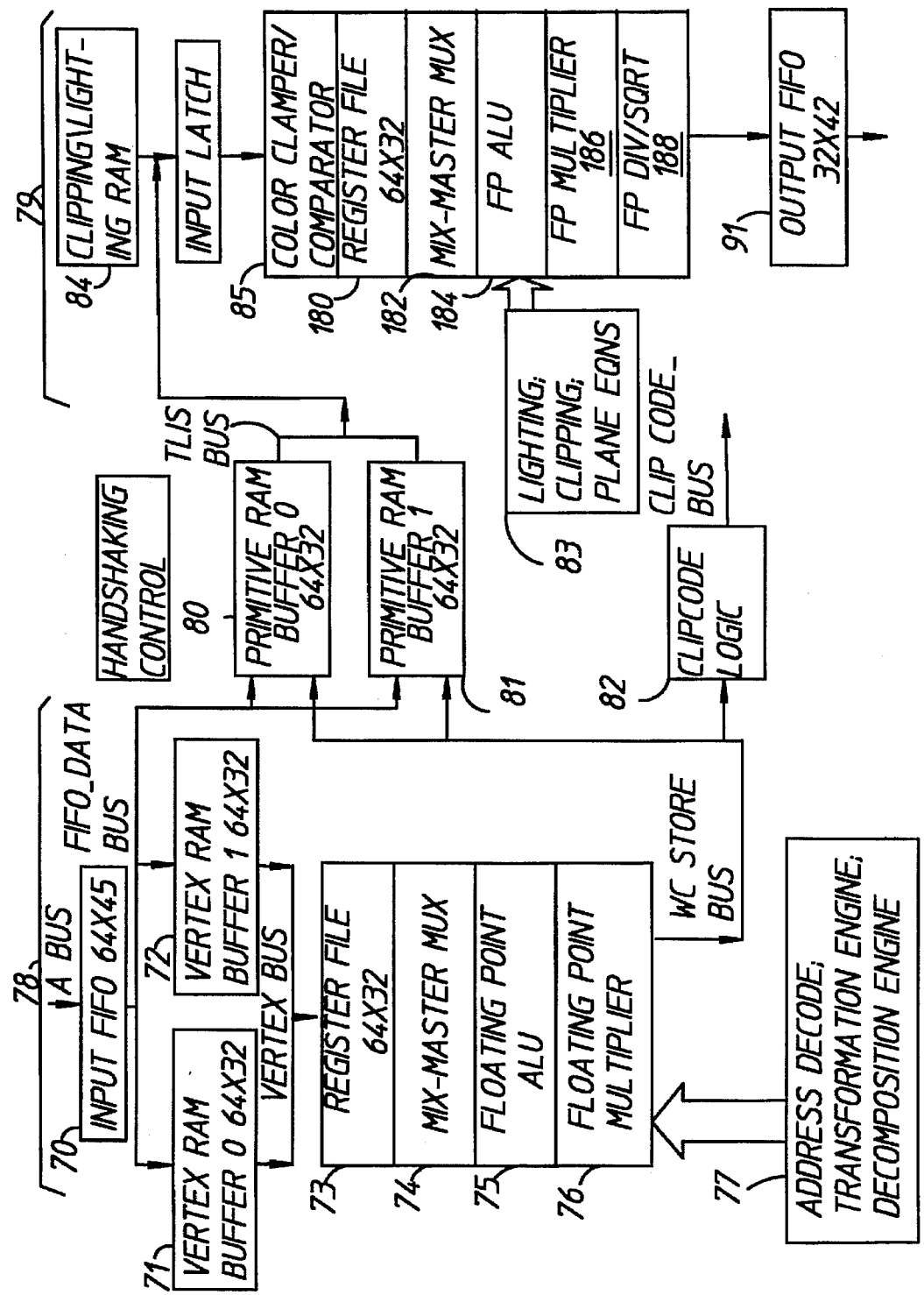
FIG. 2 is a block diagram of a geometry accelerator incorporating an embodiment of the present invention.

A simplified block diagram representative of geometry accelerator chips 32A, 32B and 32C is shown in FIG. 2. Primitive data from host computer 15 is supplied through an input FIFO 70 to a double-buffered vertex RAM which includes vertex RAM (buffer 0) 71 and vertex RAM (buffer 1) 72. The geometry accelerator includes two separate processors in a pipeline configuration. A left stack 78 includes clip code logic 82, a register file 73, a multiplexer 74, a floating point ALU 75 and a floating point multiplier 76. Operations of the left stack 78 are controlled by a left stack control unit 77, which includes address decode logic, a transformation engine and a decomposition engine. Results from the left stack 78 are supplied to a right stack 79 through a double-buffered primitive RAM, including a primitive RAM (buffer 0) 80 and a primitive RAM (buffer 1) 81. The right stack includes a color clamper/comparator 85, a register file 180, a multiplexer 182, a floating point ALU 184, a floating point multiplier 186, and a floating point divide/square root unit 188. Results from the right stack 79 are supplied through an output FIFO 91 to the texture mapping board 12 and the frame buffer board 14 (FIG. 1). Operations of the right stack 79 are controlled by a right stack control unit 83. The right stack performs lighting, clipping, and plane equation calculations. Clipping and lighting parameters are supplied by the host computer 15 to a clipping/lighting RAM 84.

The geometry accelerator performs transformations, decomposition of quadrilaterals, partial slope calculations for triangles and vectors, lighting (or shading), clipping, and plane equation (or slope) calculations of randomly oriented and defined quadrilaterals (quads), triangles and vectors. The outputs are supplied to the scan converters in the frame buffer board 14 for rendering into pixel data and to texture mapping board 12 for generation of per pixel texture color values.

In the example of FIG. 2, only the right stack 79 contains a divider, in order to limit size and cost. Because the right stack contains a divider and the left stack does not, the partitioning of functionality of the geometry accelerator is for the left stack to perform transformations, partial slope calculations, clip checking, decomposition and some pre-calculations for lighting. The right stack performs lighting, clipping and plane equation calculations. The basic flow of operations is for primitive data to be entered in the input FIFO 70 from the host computer. The primitive data is put into one of the vertex RAM buffers 71 and 72 The left stack 78 then performs transformations, decomposition, and partial slope calculations and places the results in one of the primitive RAM buffers 80 and 81. When the left stack has completed its operations for a primitive, it notifies the right stack 78 to begin operations on the primitive. The left stack can then start working on the next primitive. At the same time, the right stack performs lighting, clipping (if required), and plane equation calculations on the primitive that is in the primitive RAM buffer.

In an alternative embodiment, both the left and right stacks contain identical hardware, including dividers. In this configuration, functionality may be partitioned such that each stack performs the same operations on different primitives.

Figure 3:
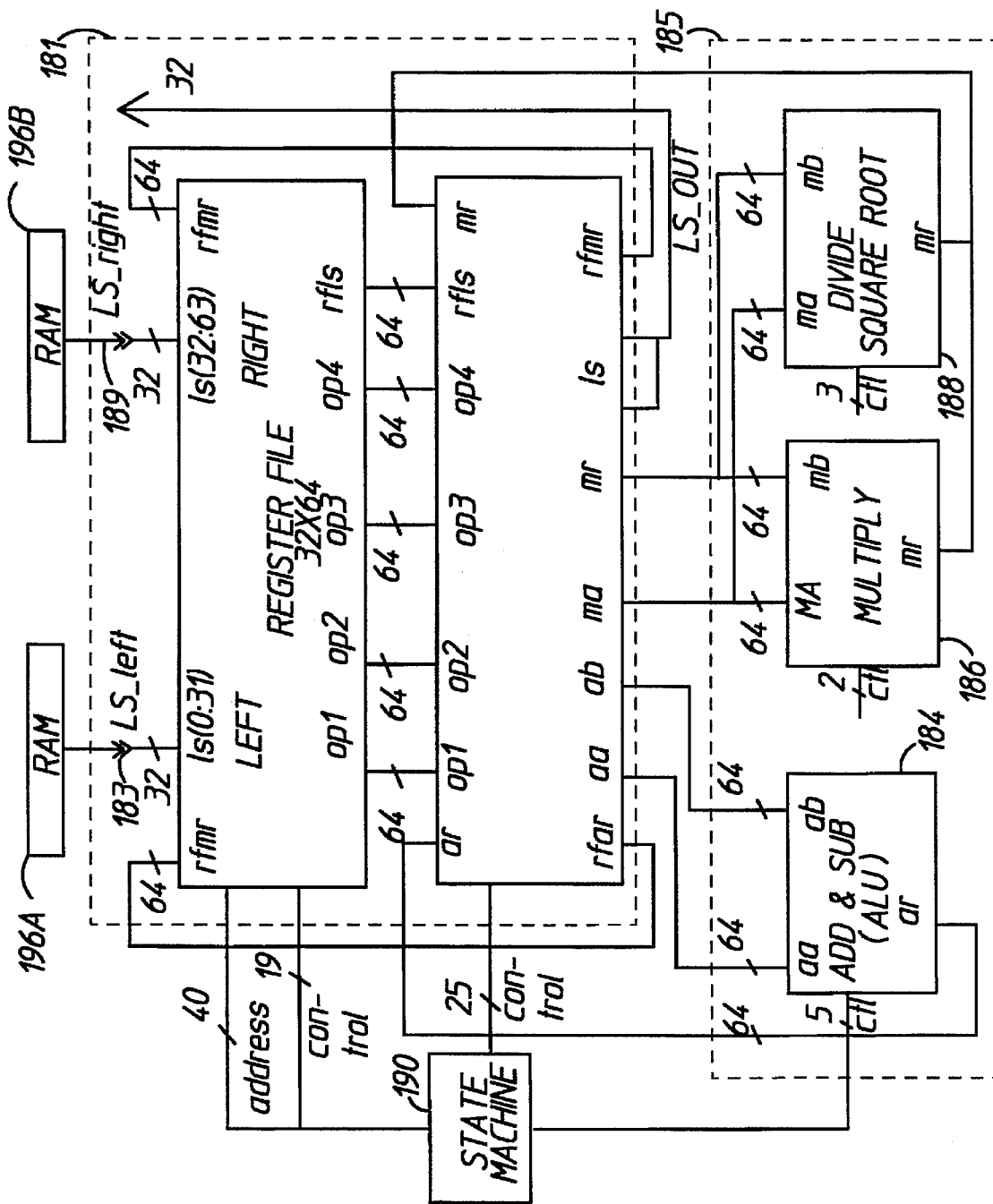
FIG. 3 is a block diagram of a portion of each geometry accelerator of FIGS. 1 and 2, showing processing circuitry for generating plane equation data.

FIG. 3 is a block diagram of exemplary circuit elements for performing plane equation generation. ALU (Arithmetic Logic Unit) 184, Multiplier 186, and Divider 188 are operatively connected to a Register File 180 and a RAM (Random Access Memory) 196 through a multiplexer/data formatter 182. In one embodiment as shown in FIG. 3, RAM 196 is made up of two RAM segments, RAM 196A and RAM 196B. RAM 196A corresponds to doubled buffered primitive RAM 80 and 81 of FIG. 2, while RAM 196B corresponds to clipping/lighting RAM 84 of FIG. 2. In a preferred embodiment, the ALU 184, Multiplier 186, and Divider 188 are all floating point circuits, but this is not necessary to realize the advantages of the invention. A combination of ALU 184, multiplier 186, and divider/square root calculator 188 may be referred to as processing unit 185. RAM 196 stores the vertex data for triangles and quadrilaterals. ALU 184 performs arithmetic operations such as additions and subtractions, while multiplier 186 and divider 188 respectively perform multiplies and divides. Register file 180 and multiplexer/data formatter 182 provide storage and data routing, and may be generally referred to as data flow circuit 181. The inputs may be received on LS_left bus 183 and LS_right bus 189. The outputs may be provided on LS_OUT bus 187, which preferably connects to a FIFO from which a fill scan stepper may receive the information used for stepping. State machine 190, which may be implemented as part of right stack controller 83 of FIG. 2, controls the other elements of FIG. 3 to generate the plane equations as described in more detail below.

In FIG. 3, the RAM 196 receives quadrilateral data definitions (typically the vertices) from the host computer 15 of FIG. 1 and from upstream processing circuitry. With respect to the system shown in FIG. 1, in a preferred embodiment the circuit elements of FIG. 3 reside within each of the 3-D geometry accelerator chips 32 A–C. RAM 196 receives data from upstream circuitry in the geometry accelerator that performs transformations and edge slope calculations. The data written in the RAM 196 by the upstream circuitry is accessed by the circuitry of FIG. 3 for performing plane equation calculation and vertex sorting as described below. Preferably, the RAM 196 is double buffered for high speed operation.

Generally, a 3-D computer graphics system in which the fill scan converter is based on triangles receives a quadrilateral definition from an external source, divides this quadrilateral definition into definitions of a first and a second triangle, and provides these definitions to the input of a plane equation generator. Then, the system generates plane equations for the first triangle, and provides these plane equations to a fill scan convertor. In FIG. 1, the fill scan converter resides within frame buffer board 14. A fill scan converter renders the filled triangles by determining a value for each parameter of each pixel based on the plane equations. In succession, the system may generate plane equations for the second triangle, and provide them to the fill scan convertor.

According to one aspect of the invention, the graphics system divides a quadrilateral into two triangles so that the plane equation generation for the second triangle may be performed more efficiently by using results from the plane equation generation for the first triangle. In order to facilitate an understanding of this aspect of the invention, the functions of a fill scan converter are described, followed by a discussion of plane equations, and the derivation of values used in the plane equations.

Figure 4:
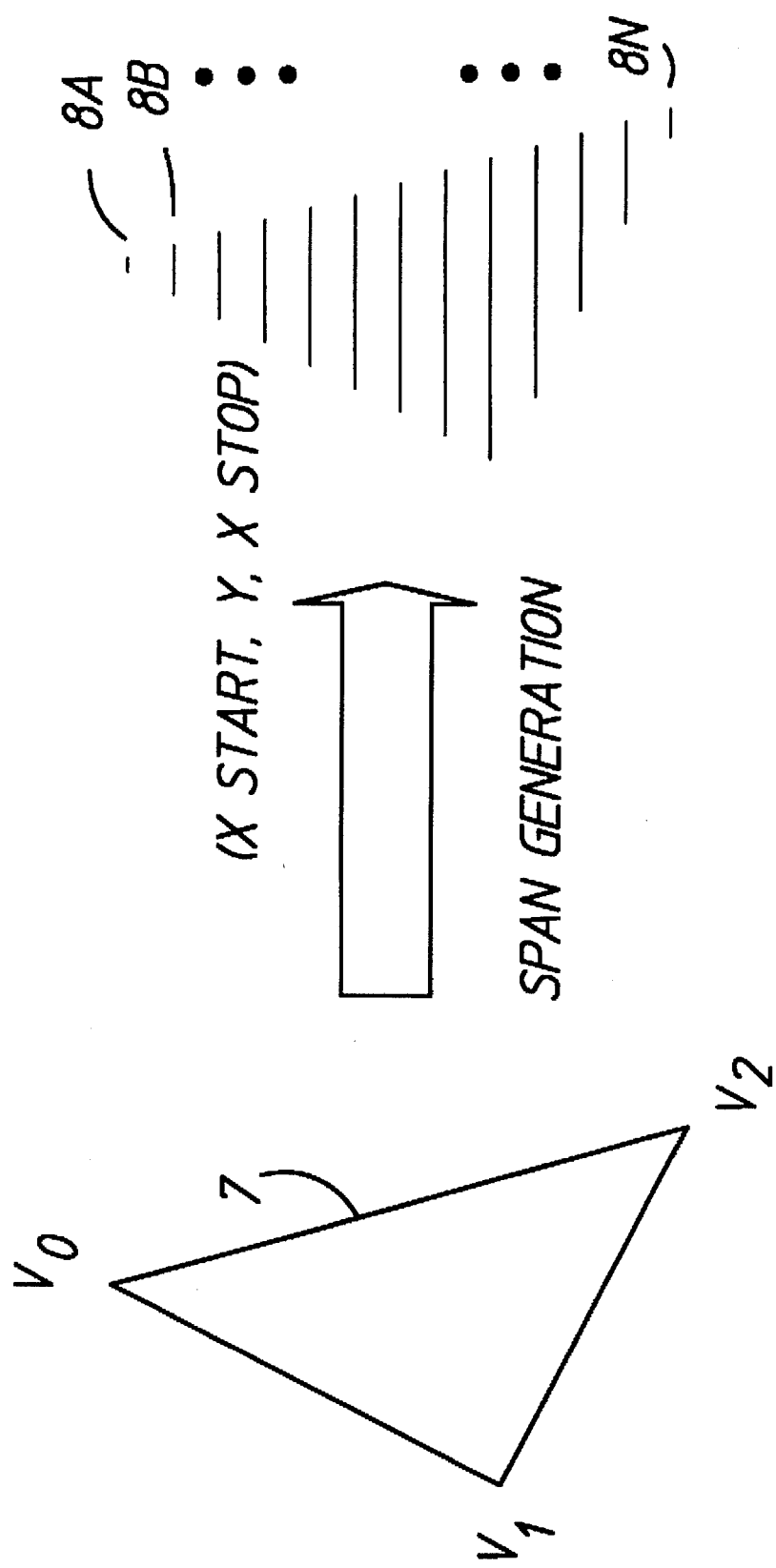
FIG. 4 illustrates span generation for a triangle to be filled, as performed by a fill scan converter.

Referring to FIG. 4, a triangle 7 can be decomposed into a series of spans 8A–8N. Each span represents one row of pixels within the triangle 7 to be filled. The fill scan converter then steps along these spans and generates pixel data, by determining a value for each of the parameters, for every pixel within the triangle. To do this, the fill scan converter is provided with the following information for each span: Y location of the span; starting and stopping X coordinates of the span; red, green, blue, and Z starting values; and slopes (dz/dx, dred/dx, dgreen/dx, and dblue/dx).

The starting value for each parameter is determined for each span by interpolating between the values specified for the parameter at each vertex (V., V1, V2). Once the starting values and the display parameter (display parameters include red, green, blue or depth) slopes (dp/dx) are known, successive pixel parameters are interpolated with the following equation:

$$p1 = p0 + dp/dx$$

In the above equation, p1 is a parameter of a next pixel, p0 is a parameter of a current pixel, and dp/dx is a partial derivative for this parameter. For example, if the parameter is red, then the intensity of red in a next pixel (p1) is determined by adding the intensity of red in a current pixel (p0) to the amount that the red intensity changes between successive pixels along the X-axis (dp/dx).

The fill scan converter performs a similar interpolation along the edge of the triangle for each parameter in order to determine the starting value for the parameter at the next span 8B. Since each of these parameters p is a linear function of X and Y, a value for a parameter at any point in a triangle can be expressed as a single plane equation in the following form:

$$p = ax + by + c$$

In the above equation, p is either red, green, blue, or z coordinate. Plane equations such as the one described above are discussed in more detail in *Computer Graphics, Principles and Practice* (Foley et al, Addison Wesley, 1990). In particular, "a", "b" and "c" are constants that define a value for p for each unique x-y location. In this disclosure, the term "generating plane equations" refers to generating the values of these constants, or determining values of alternate constants will also describe plane equations, as described below.

The first pixel value p0 of the first, or starting span 8A is supplied by the plane equation generator. From this starting span, which for the purposes of this disclosure is the minimum Y span, the fill scan converter can compute the starting parameter values for other spans 8B–8N. By convention, X increases from left to right and Y increases from top to bottom on the display screen. The following equations may be used by the fill scan converter for stepping in the Y direction along an edge. The edge can be described by x=edge_slope * y+b, where the edge_slope=dx/dy (the change in X with respect to Y) for the edge:

$$p0 = ax0 + by0 + c;$$

$$p1 = ax1 + by1 + c$$

where p0 is a value of a parameter for one pixel representing an edge, and p1 is a value of that parameter a pixel that represents the start pixel of the next span. Also, (x0, y0) and (x1, y1) define successive points on the edge. However, since x1=x0+dx and y1=y0+1 for a step in Y along the edge, the following equations hold true:

$$p1 = a(x0 + dx) + b(y0 + 1) + c$$
$$= (ax0 + by0 + c) + a\,dx + b$$
$$= p0 = + a\,dx + b$$

In the equation above, the value of "a" is a constant for the entire triangle. In a general line for a constant dy, the value of dx is a constant but typically is not an integer. However, because pixels are in discrete positions, the fill scan converter places each pixel on an integer X value, so dx may be replaced by an integer value Ax, which will change as the error accumulates between the dx of the real line and the chosen pixels. However, the integer Ax chosen is always going to be either edge_slope rounded down, or edge_slope rounded up. Therefore, the above equation becomes:

$$p1 = p0 + b + a \text{ rounddown (edge\_slope)} + \text{adjustment}$$

where rounddown (A) refers to value "A" rounded down to the nearest integer. The term [b+(a rounddown(edge_slope))] may be a precomputed constant and adjustment=a if abs (x1−x0)>abs(edge_slope) (if Δx was edge_slope rounded up); or adjustment=0 if abs (x1−x0)=<abs (edge_slope) (if Δx was edge_slope rounded down)

In order to determine pixel p(I) where p(I) is the value for parameter p for x=I along a span 8:

$$p(I) = p(I - 1) + b + [a \text{ rounddown (edge\_slope)}] + \text{adjustment};$$
$$\text{adjustment} = a \text{ if } abs\ (x(I) - x(I - 1)) > abs\ (\text{edge\_slope});$$
$$\text{adjustment} = 0 \text{ if } abs\ (x(I) - x(I - 1)) = < abs\ (\text{edge\_slope})$$

It may be noted that Δx will be equal to edge_slope rounded up only when there is a carry out of the fractional position when edge_slope is added to X(I−1) to arrive at X(I). The above equations do not require that any multiplications be performed. Accordingly, given a starting pixel of a span 8A, and the initial parameters of the span 8A, subsequent starting parameters of the first pixel of the next span 8B can be generated with simple adders and counters, thereby simplifying the architecture of the fill scan converter.

Figure 5B:
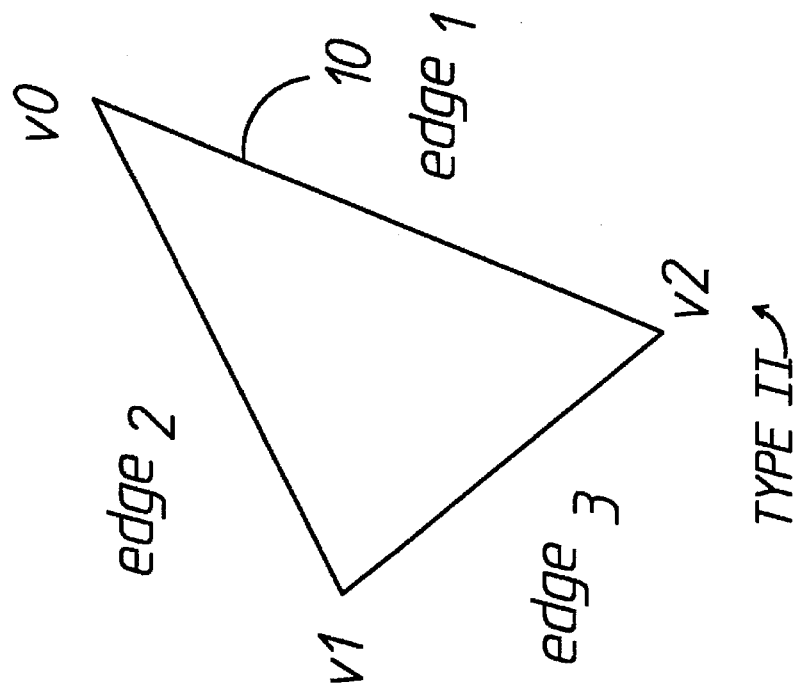
FIG. 5b shows a second type of triangle in which the longest edge is the right side of the triangle.
Figure 5A:
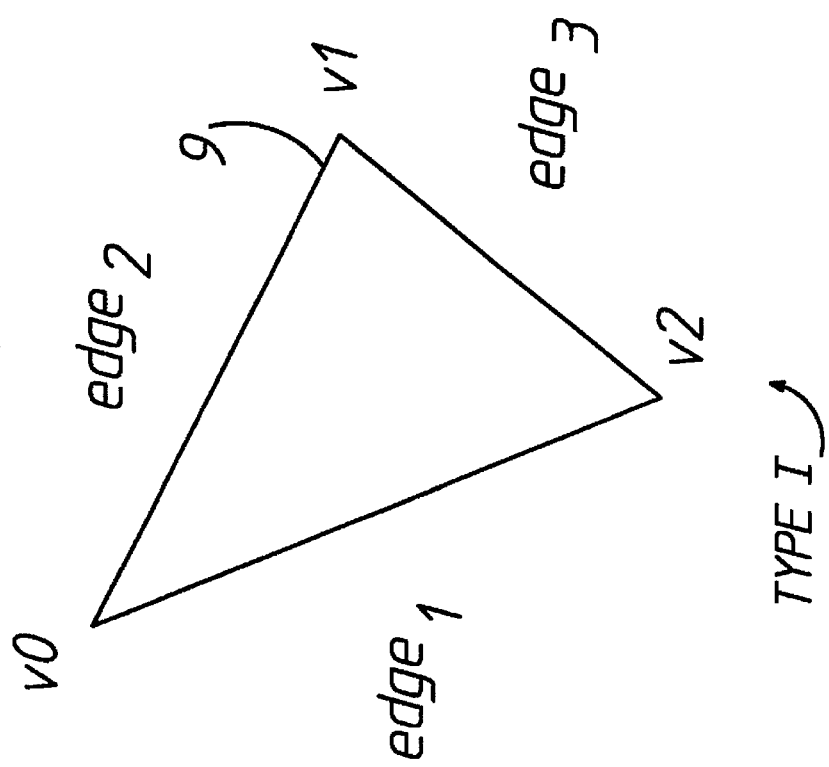
FIG. 5a shows a first type of triangle in which the longest edge is the left side of the triangle.

Since all spans 8A–8N are typically generated as X spans, triangle edges will typically be stepped in the Y direction. FIGS. 5a and 5b, respectively, show type I and type II triangles that the fill scan converter fills. For this designation, a type I triangle 9 has a single left-hand edge that is the longest edge, in the Y-direction, of the triangle 9, whereas a type II triangle 10 has a single right-hand edge that is the longest edge, in the Y-direction, of the triangle 10. With this designation, the fill scan converter can be designed to always step from the edge identified as edge 1, which may simplify the structure of the fill scan converter. Further, the fill scan converter can be designed to step triangles from top to bottom (increasing Y), which may also simply the structure of the fill scan converter. Depending on the type of the triangle that contains them, spans will be interpolated either left-to-right (type I triangle 9, shown in FIG. 5a), or right-to-left (type II triangle 10, shown in FIG. 5b). Triangles with one edge perfectly horizontal may be treated as either type.

Figure 6:
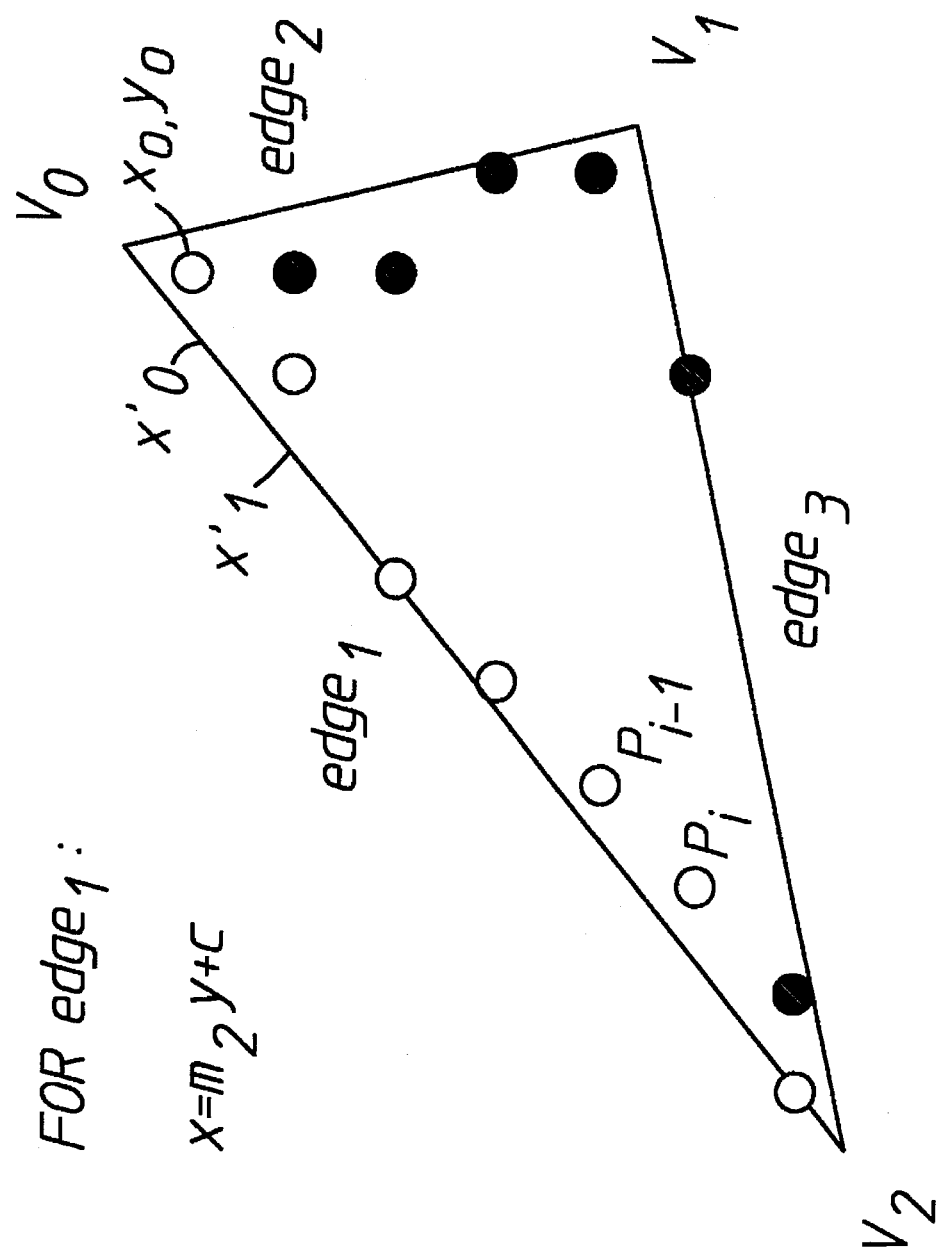
FIG. 6 shows details of pixels and the associated parameters, which are used by a fill scan converter to fill a triangle.

Referring to FIG. 6, the fill scan converter uses values designated as x'0, y0 and m2 to fill the triangle shown. In this instance, x'0 is the value of the X-coordinate, not necessarily an integer, at the point along edge 1 which intersects the Y value of the first span. The value y0 is the Y coordinate for the first span, and is an integer. The value m2 is the slope (change in X divided by change in y) along edge 1. The choice of a starting pixel's X value is based upon the next X value in direction of the X step. The direction of the X step may then be determined by the sign of m2. To determine the stopping point of the span, the opposing edge (either edge 2 or edge 3) is also stepped in a similar manner.

In summary, a fill scan converter uses the following values, which represent one version of a plane equation:

1. The value of "a" for each parameter from the general form of the plane equation, also referred to as dp/dx, which is equal to the derivative of parameter "p" with respect to the X direction. This value is labeled dP_dX, where P=[R, G, B, Z].

2. The value of "b" for each parameter from the general form of the plane equation, also referred to as dp/dy above, which is equal to the derivative of parameter "p" with respect to the Y direction. Before this value is passed to the fill scan converter, however, it is combined with the value of [a rounddown (edge1 slope)], where "a" is as above, and "rounddown (edge 1_slope)" is the integer portion of the slope, dx/dy of edge 1. Thus, the quantity (b+[a rounddown (edge1_slope)] is used. This is labeled dP_dE1 where P=[R, G, B, Z].

3. The starting parameter values for p0 (the first pixel which is generated). These are labeled P_Start, where P=[R, G, B, Z].

In addition, the fill scan converter uses the following X,Y edge information to step the triangle edges and define the triangle spans:

4. The slope, dx/dy, of all three triangle edges. These are labeled EdgeN Slope where N=[1,2,3].

5. The starting and stopping Y value of edge1. The fill scan converter will round these values, so the starting and stopping Y value of edge 1 will be equal to the actual y-axis values of vertex 0 and vertex 2. The vertices are typically sorted so that edge1 is always the long (in Y) edge as shown in FIG. 5a and 5b. These are labeled Edge1_Y_Start and Edge1_Y_Stop.

6. The starting Y value of edge3, which need not be adjusted to any particular Y intercept. The fill scan converter will typically truncate this value internally. This value is used since initially edge1 and edge2 define the spans. However, once the Y span is greater than or equal to Edge3_Y_Start, then edge1 and edge3 will define the span.

7. The starting X value for each edge, adjusted to the integer Y start value for that edge. (The X value itself will normally not be an integer, except by chance.) These are labeled EdgeN_X_Start, where N=[1,2,3].

8. A flag (X_INCREMENT) indicating whether the triangle is a Type I or a Type II triangle as shown in FIG. 5a and 5b. For Type I triangles, shown in FIG. 5a, all the spans between edge1 and edge 2 and edge 3 increase in X. For type II triangles, shown in FIG. 5b, all the spans between edge1 and edge2 or edge3 decrease in X.

To generate the plane equations from three vertices of a triangle, it may be assumed that all three vertices have coordinates of the form (X, Y, Z, RED, GREEN, BLUE). In other words, they all have a depth and color information along with the X and Y coordinates. All of the concepts disclosed herein are equally applicable for instances in which the vertices only have X and Y coordinates, or any combination of the above parameters.

As discussed earlier, a plane equation generator may receive triangle definitions after a quadrilateral has been divided into two triangles and then generate plane equations based on these triangle definitions. It does so by following a process that has been divided into six steps 120, 122, 124, 126, 128, 130 in FIG. 7. The order of these steps are not required to be performed in the order shown in FIG. 7, and may be performed simultaneously or in parallel to some extent. These steps will now be discussed in detail. The discussion assumes that the vertices have already been sorted such that v0.y<=v1.y<v2.y. In other words, the value of the Y-axis at vertex V0 is less than or equal to the value of the Y-axis at vertex V1, which in turn is less than the value of the Y-axis at vertex V2, as shown in FIG. 5a and FIG. 5b.

The plane equation generator first calculates the edge deltas (step 120). The edge delta for a parameter is the amount by which that parameter changes along one edge. Only two edge deltas are needed for the Z-axis (depth) and color parameters, since two such values are sufficient for determining the partial derivatives. Also, as depicted in the equations below, the edge deltas are each defined in a direction so that the edge deltas have a consistent direction around the triangle. This is useful for quadrilateral decomposition. However, to generate plane equations, generally a cross product is determined between two of the edges, anchored at the vertex which is adjacent to both of the two edges. For illustrative purposes, the anchored vertex is shown to be vertex V0 in this disclosure. However, either of the other vertices may be chosen as the anchored vertex of the cross products, in which case the equations below would appear in different form. In the equations below, the letter "n" in a variable indicates that the variable is a normalized coordinate with respect to the consistent edge direction, and "mn" indicates that the variable is a negative of a normalized coordinate with respect to the consistent edge direction. For example, nx1 is the normalized change along the X-axis from vertex 0 to vertex 1 (edge 2). Also, mnx2 is the negative of the normalized change along the X-axis for edge 1, also referred to as edge 1 dx. As shown below, mnx2 is equal to the difference between the X value at vertex 0 (v0.x) minus the X value at vertex 2 (v2.x). Refer to FIG. 5a, 5b, or 6 for edge designations. Finally, dxe3 (the dx of edge 3) is the change in the X-axis along the X-axis for edge 3, or from vertex V2 to vertex V0. Similar variables are used for the other parameters.

$$mnx2 = v0 \cdot x - v2 \cdot x$$
$$nx1 = v1 \cdot x - v0 \cdot x$$
$$dxe3 = v2 \cdot x - v1 \cdot x$$

$$mny2 = v0 \cdot y - v2 \cdot y$$
$$ny1 = v1 \cdot y - v0 \cdot y$$
$$dye3 = v2 \cdot y - v1 \cdot y$$

$$mnz2 = v0 \cdot z - v2 \cdot z$$
$$nz1 = v1 \cdot z - v0 \cdot z$$

$$mnred2 = v0 \cdot red - v2 \cdot red$$
$$nred1 = v1 \cdot red - v0 \cdot red$$

$$mngreen2 = v0 \cdot green - v2 \cdot green$$
$$ngreen1 = v1 \cdot green - v0 \cdot green$$

$$mnblue2 = v0 \cdot blue - v2 \cdot blue$$
$$nblue1 = v1 \cdot blue - v0 \cdot blue$$

The plane equation generator then calculates the edge slopes (step 122) with respect to X and Y. Using some of the values calculated above, for example, the slope of edge 1 (edge1_slope) is equal to the change in X along edge 1 (mnx2 above) divided by the change in Y along edge 1 (mny2 above), with similar calculations for the other edges:

$$edge1\_slope = mnx2/mny2$$
$$edge2\_slope = nx1/ny1$$
$$edge3\_slope = dxe3/dye3$$

The plane equation generator then initializes the Y edge start/stop values (step 124). These include the starting Y value of edge 1 (edge1_y_start), the stopping Y value of edge1 (edge1_y_stop), and the starting Y value of edge 3 (edge3_y_start). Note that these are not sub-pixel adjusted so the values are not necessarily integers and may be determined directly from the Y-axis values of the vertices:

$$edge1\_y\_start = v0 \cdot y$$
$$edge1\_y\_stop = v2 \cdot y$$
$$edge3\_y\_start = v1 \cdot y$$

Next, the plane equation generator calculates the X edge starts, adjusted along an edge (edge1 as shown in FIG. 6) from the nearest vertex (vertex V0 of FIG. 6) to first Y-span intersection (step 126). To generate these values (edge1_x_start, edge2_y_start, and edge3_y start), two fractions are first determined. The fraction frac_y0 is the amount along the Y-axis from vertex V0 to the next larger Y integer (i.e. the first Y span), while frac_y1 is the difference between Y value of vertex 1 and the next larger Y integer. Each X starting point can then be determined by adding the X value of one of the vertices to the product of one of the edge slopes and one of the fractions, as seen below:

$$frac\_y0 = roundup(v0 \cdot y) - v0 \cdot y$$
$$frac\_y1 = roundup(v1 \cdot y) - v1 \cdot y$$

$$edge1\_x\_start = v0 \cdot x + edge1\_slope * frac\_y0$$
$$edge2\_x\_start = v0 \cdot x + edge2\_slope * frac\_y0$$
$$edge3\_x\_start = v1 \cdot x + edge3\_slope * frac\_y1$$

In a preferred embodiment, the round_up function always rounds to the nearest largest integer. For example, (−1.3) would be rounded to (−1.0). Similarly, a rounddown is preferably always rounding in the direction of a next smallest integer. The plane equation generator then calculates the partial derivatives for Z and colors and the triangle type (I or II) (step 128): First, a partial derivative denominator (one_over_cd) is determined, which is indicative of whether the triangle is type I or type II. The partial derivative calculations are all based on a cross product of these two vectors from vertex 0 to vertex 2 and vertex 0 to vertex 1. However, the cross product can be based on any vertex (0, 1 or 2), since for a triangle one and only one plane can be defined, since for any plane them is only one normal (ignoring the sign and magnitude) to the plane.

$$one\_over\_cd = \frac{1.0}{mny2 * nx1 - mnx2 * ny1}$$

$$x\_increment = [1 \text{ if one\_over\_cd} < 0.0(sign(one\_over\_cd))]$$
$$[0 \text{ if one\_over\_cd} \geq 0.0(sign(one\_over\_cd))]$$

$$e1\_slope = truncate(edge1\_slope)$$

$$dz/dx = (mny2 * nz1 - mnz2 * ny1) * one\_over\_cd$$
$$dz/dy = (mxz2 * nx1 - mnx2 * nx1) * one\_over\_cd$$
$$dz/de1 = dz/dy + dz/dx * e1\_slope$$

$$dred/dx = (mny2 * nred1 - mnred2 * ny1) * one\_over\_cd$$
$$dred/dy = (mnred2 * nx1 - mnx2 * nred1) * one\_over\_cd$$
$$red/de1 = dred/dy + dred/dx * e1\_slope$$

$$dgreen/dx = (mny2 * ngreen1 - mngreen2 * ny1) * one\_over\_cd$$

-continued $dgreen/dy = (mngreen2 * nx1 - mnx2 * ngreen1) * one\_over\_cd$
$dgreen/de1 = dgreen/dy + dgreen/dx * e1\_slope$ $dblue/dx = (mny2 * nblue1 - mnblue2 * ny1) * one\_over\_cd$
$dblue/dy = (mnblue2 * nx1 - mnx2 * nblue1) * one\_over\_cd$
$dblue/de1 = dblue/dy + dblue/dx * e1\_slope$ The function "truncate," in this disclosure, refers to rounding to the next integer that is closer to a zero value. Next, the plane equation generator calculates the Z and color starts, adjusted from vertex to the first pixel drawn (step 130):

$frac\_x0$ = [roundup(edge1\_x\_start) - v0 · x(if x\_increment = 1)

[rounddown(edge1\_x\_start) - v0 · x(if x\_increment = 0)

$z\_start = v0 · z + dz/dy * frac\_y0 + dz/dx * frac\_x0$
$red\_start = v0 · red + dred/dy * frac\_y0 + dred/dx * frac\_x0$
$green\_start = v0 · green + dgreen/dy * frac\_y0 + dgreen/dx*frac\_x0$
$blue\_start = v0 · blue + dblue/dy * frac\_y0 + dblue/dx *frac\_x0$ The sign of one\_over\_cd determines if the cross product is pointing out of or into the page. Thus, this sign can be used to determine if the triangle is a Type I or Type II triangle.

All of the start/stop values except Y's are adjusted away from the vertex for use by the fill scan converter. The edgeN\_x\_starts are adjusted from the vertex X to the intersection of the edge with the first span below the vertex. The Z, RED, GREEN, BLUE starts are all adjusted from vertex V0 to the first pixel which will be rendered by the fill scan converter. The first pixel calculated by the fill scan converter is the one on the span immediately below v0 and the leftmost pixel on this span which is on or inside of edge1, as depicted in FIG. 6.

Figure 8B:
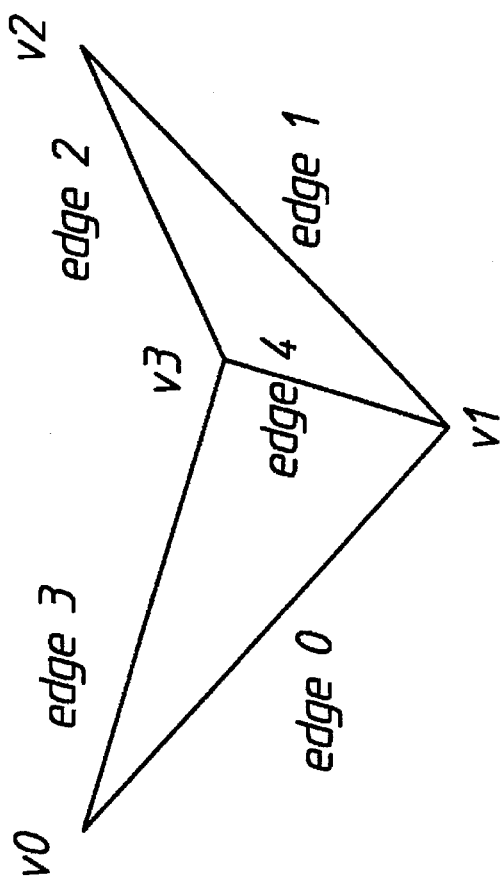
FIG. 8b shows a concave quadrilateral which may be divided into two triangles.
Figure 8A:
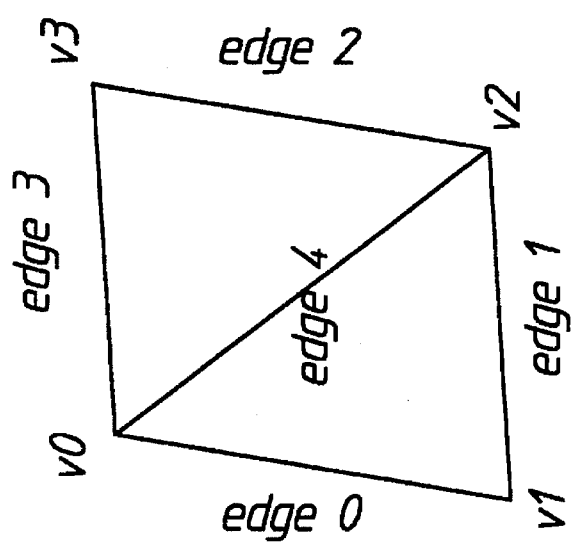
FIG. 8a shows a quadrilateral which may be divided into two triangles.

As described previously, a quadrilateral may be divided into two separate triangles, and then each triangle may be input separately to a plane equation generator to generate the appropriate plane equations. FIG. 8a shows a quadrilateral which may be divided into two triangles, and FIG. 8b shows a concave quadrilateral which may be divided into two triangles. As may be seen from both FIG. 8a and FIG. 8b, the result is two triangles with a shared edge.

According to one aspect of the invention, the shared edge and the two shared vertices are taken advantage of to eliminate a portion of the plane equation calculations described above, in particular with respect to the second triangle. Additional performance may be gained by beginning some of the calculations for the second triangle while the plane equations for the first triangle are being generated.

Figure 9B:
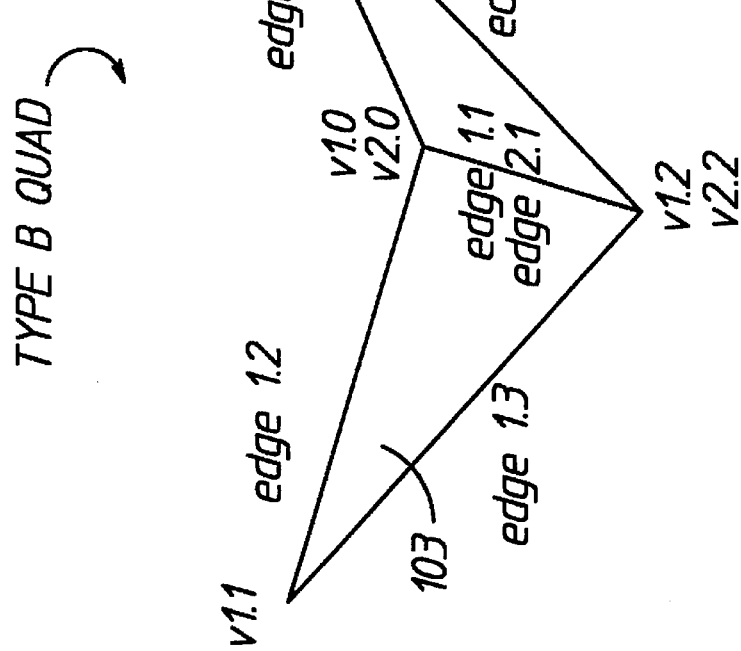
FIG. 9b shows naming conventions of the edges and vertices of the quadrilateral shown in FIG. 8b.
Figure 9A:
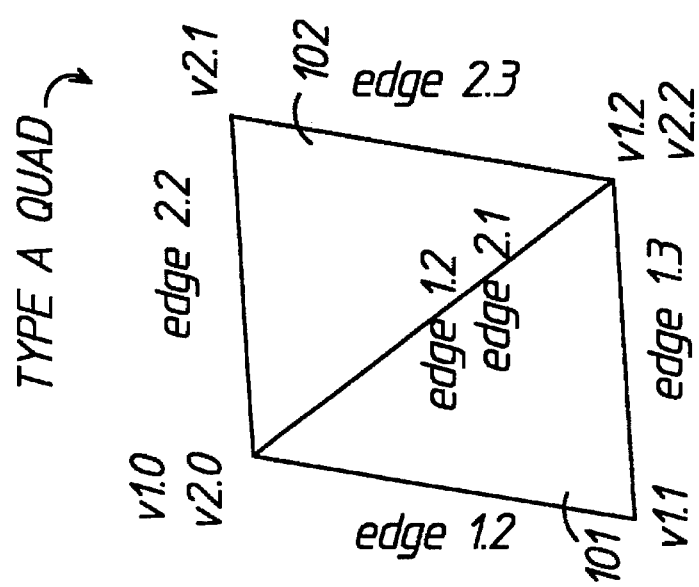

FIG. 9a shows naming conventions for the edges and vertices of the quadrilateral shown in FIG. 8a, and FIG. 9b shows naming conventions for the edges and vertices of the quadrilateral shown in FIG. 8b.

For example, in FIG. 9a, first triangle 101 has three vertices V1.0, V1.1, and V2.0, as well as edge 1.1, edge 1.2, and edge 1.3. Second triangle 102 has vertices V2.0, V2.1, and V2.2 as well as edge 2.1, edge 2.2, and edge 2.3. In these figures, the first numeral identifies the triangle and the second numeral refers to the vertex or edge within the triangle. For example, V2.1 is vertex 1 of second triangle 102. These naming conventions facilitate the generation of two triangles which will both have an identical edge 1 (edge 1.1 for triangle 101, and edge 2.1 for triangle 102), as well as identical vertex 0 (V1.0 and V2.0) and vertex 2 (V1.2 and V2.2). Similar sharing exists between first triangle 103 and second triangle 104 of FIG. 9B.

Since edge 1 is shared between the two triangles in a quadrilateral, the plane equation generation for the second triangle may be performed using results from the plane equation for the first triangle to improve processing efficiency. For example, the variable mnx2 is the normalized change along the X-axis for edge1, also referred to as edge 1 dx. Since mnx2 has already been calculated for triangle 101 of FIG. 9a, and since the designations make edge1 identical for triangle 101 and triangle 102, mnx2 need not be recalculated for triangle 102. A more detailed description of how the processing efficiency may be improved is provided below.

Referring again to FIG. 3, register 180 provides quicker access than RAM 196 for data such as the vertex data, for ALU 184, Multiplier 186, and Divider 188. Accordingly, if a parameter can be accessed from register 180 instead of RAM 196, the operation is performed in less time. Therefore, in one embodiment of the invention, prior to performing a computation, the parameters are normally fetched from RAM 196 and placed in register 180. Then, the access time is reduced when the same parameters are directly accessed from register 180. However, the fetching from RAM 196 to register 180 may be eliminated during generation of the plane equations for a second triangle for any data associated with the shared edge and the shared vertices of the two triangles of a quadrilateral, as well as other interim parameters. In this disclosure, the term "fetch" is used to describe the operation of moving a value from RAM 196 to register file 180.

The fetches from RAM 196 to register 180 which may be skipped for the second triangle include v0.x, v0.y, v0.z, v2.x, v2.y, v2.z, mnx2, and mny2, because these values are already stored in register 180 as a result of the calculations performed for the first triangle. The values are already stored because the values are associated with vertex 0, vertex 2, or edge 1, all of which are identical for both triangles as a result of the designations shown in FIGS. 9a and 9b.

Additionally, the calculation of the following values can be skipped for the second triangle: mnz2, ranred2, nmgreen2, mnblue2, and edge1\_slope. These calculations may be skipped because these values are already calculated as a result of the calculations performed for the first triangle, since these values are also related to shared edge 1 as shown in FIGS. 9a and 9b.

Figure 10:
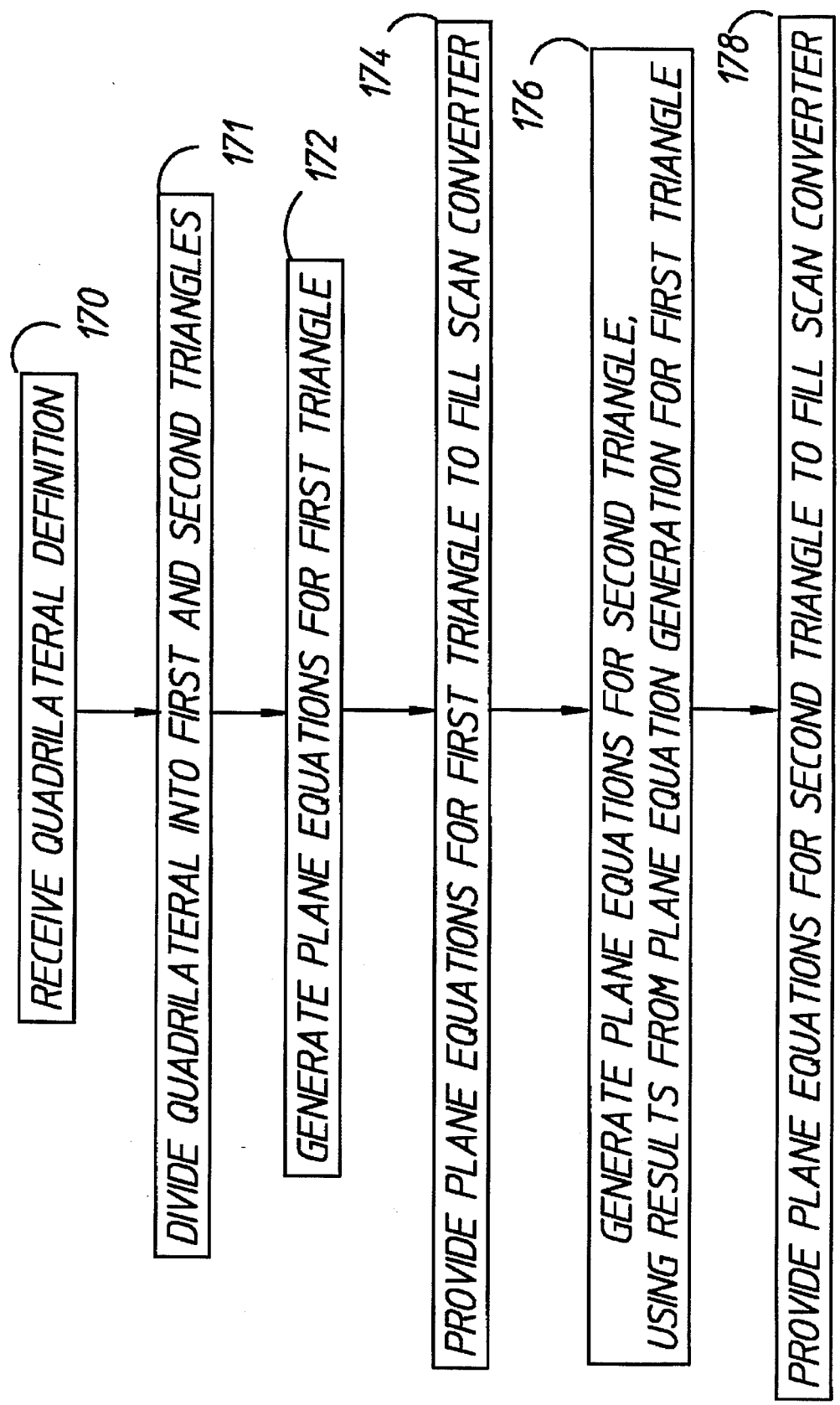
FIG. 10 is a flowchart illustrating the operation of the circuitry shown in FIG. 3 for another approach to generating plane equations for triangles that make up a quadrilateral.

FIG. 10 shows a process for calculating plane equations for a quadrilateral in accordance with one embodiment of the invention. In step 170, the definition of a quadrilateral is received. In step 171, the quadrilateral is divided into a first triangle and second triangle. As described above, this step may include dividing the quadrilateral so that two shared vertices and one shared edge exist for each triangle. In addition, the step of dividing may include designating the edges and vertices of the triangle so that the shared vertices and the shared edge will have the same designation for each triangle. In step 172, the plane equations are generated for the first triangle. The plane equations for the first triangle are provided to the fill scan converter (step 175). In step 176, the plane equations are generated for the second triangle using results from the plane equation generations for the first triangle. For example, step 176 may include using interim results from the generation of the plane equations of the first triangle, such as values that have already been stored in a register. Additionally, the results may include constants for the plane equations such as mnz2, etc. Accordingly, step 176 may begin prior to the completion of step 174. Since the circuit shown in FIG. 3 includes a separate ALU 184, multiplier 186, and divider 188, several operations may be performed in parallel. In step 178, the plane equations for the second triangle are provided to the fill scan converter.

FIG. 11 lists fetch and calculate functions which are performed in one embodiment of the invention, which illustrates the advantages achieved by designating the triangles in the manner described above, and then eliminating redundant operations such as the fetches and calculations. Note that some fetches and calculations may be performed twice. For example, in one embodiment, as represented by FIG. 11, the edge1_slope is generated for the second triangle as well as the first triangle. In addition, the fetches of v0.x, v2.x, and v2.y were not skipped for the second triangle. Depending on different architectures used to implement the plane generation equations, this may impact speed. However, to simplify the architecture of the circuitry, it may be advantageous to instead perform the edge1_slope calculations twice. In such an embodiment, this would likely result in an addition of only two clock cycles.

Additionally, in an arrangement such as that shown in FIG. 3, the multiplier 186 is often the bottleneck with respect to processing throughput, since there are often more multiply/divide operations than ALU operations. Also, in the embodiment shown in FIG. 3, the multiplier 186 and divider 188 share common buses that are effectively time multiplexed for the inputs and outputs of the multiplier 186 and divider 188. As a result, even though some steps may be skipped, such as the fetches listed above, this may not impact throughput since accesses to the register file 180 by ALU 184 and divider 188 may not decrease throughput unless multiplier 186 also increases its own throughput.

However, in an alternate embodiment, both the edge1_slope calculation and the fetch of v0.x, v2.x, v2.y, would be skipped for the second triangle. Any combination of skipping fetches and/or calculations is within the scope of this invention.

As indicated above, FIG. 3 shows a preferred embodiment for a system to perform triangle generation and plane equation generation. However, these functions may be performed in either hardware as shown, in software, or as a combination of hardware and software. In a software embodiment, the software may run on a general purpose computer, or a computer optimized to perform the necessary functions. Such a computer would generally include a CPU, program memory such as a hard drive or EPROM, data memory such as random access memory, and a processing bus to interface among these elements. A communications device may also be used to interface to the fill scan converter.

Another aspect of the invention relates to vertex sorting. A fill scan converter typically begins stepping across spans at the top of the display screen, and then proceeds to lower spans (increasing Y value) to perform stepping for the lower spans (refer to FIG. 4). This order, in which the top span is performed first, may be indicated to the fill scan converter by defining vertex V0 as the top vertex. Accordingly, a graphics system may include a vertex sorter that receives the triangle information such as the data for the three vertices V0, V1, V2. Such a vertex sorter sorts the data for the vertices and provides the data in a sorted order to the plane equation generator. This vertex sorting also results in an edge sorting, in order to retain the designations for edges and vertices as explained with respect to FIGS. 5a and 5b. The plane equation generator performs the steps shown in FIG. 7, for example, to generate the plane equations, which are then provided to the fill scan converter.

Figure 7:
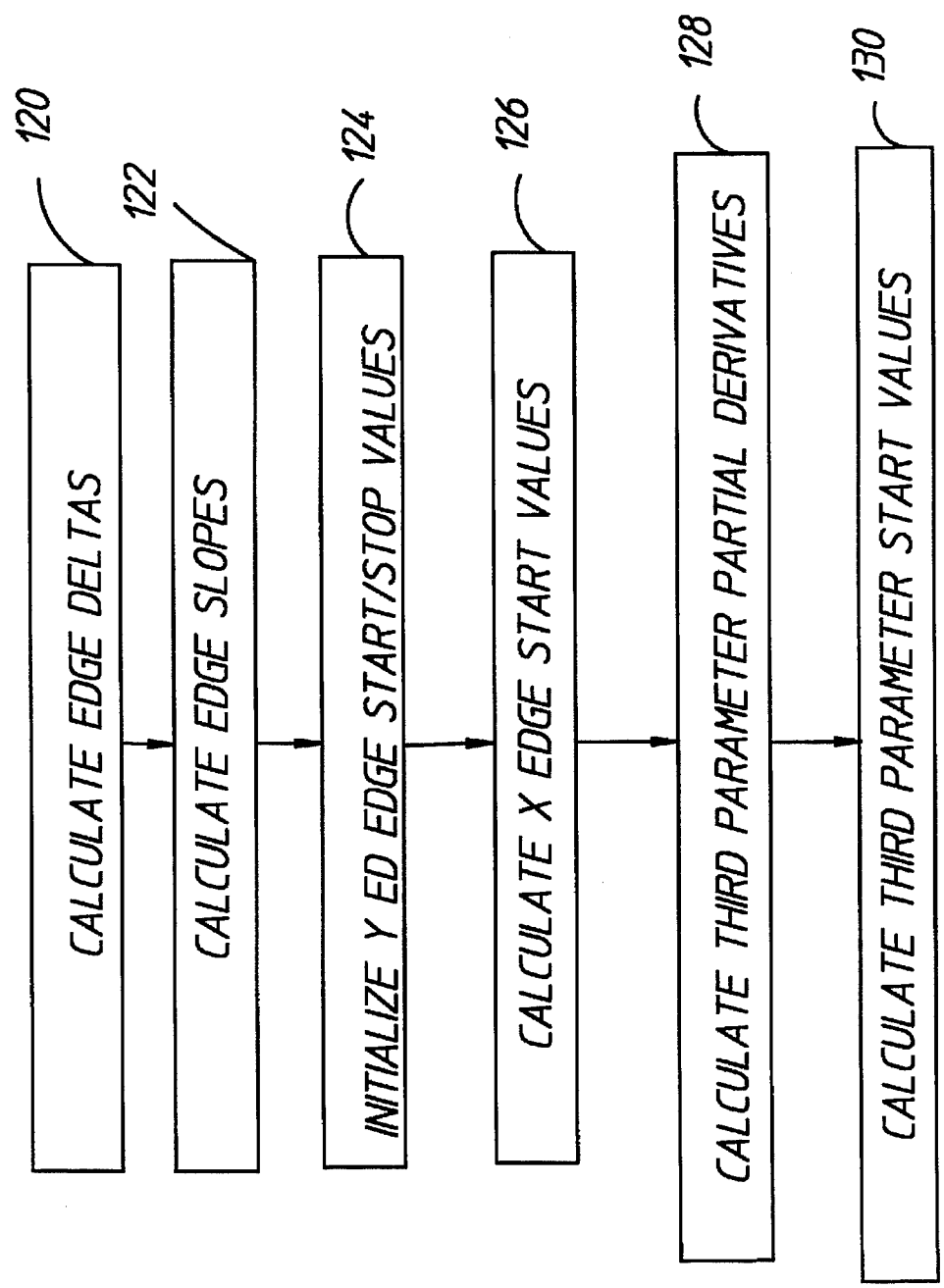
FIG. 7 is a flowchart illustrating the operation of the circuitry of FIG. 3 for serial plane equation generation.

However, only certain values of the plane equations calculated in FIG. 7 are dependent upon the vertex sort. Thus, sorting may be performed simultaneously with the first several steps of the process shown in FIG. 7, resulting in a more efficient process and the reduction of processing resources required.

Figure 14:
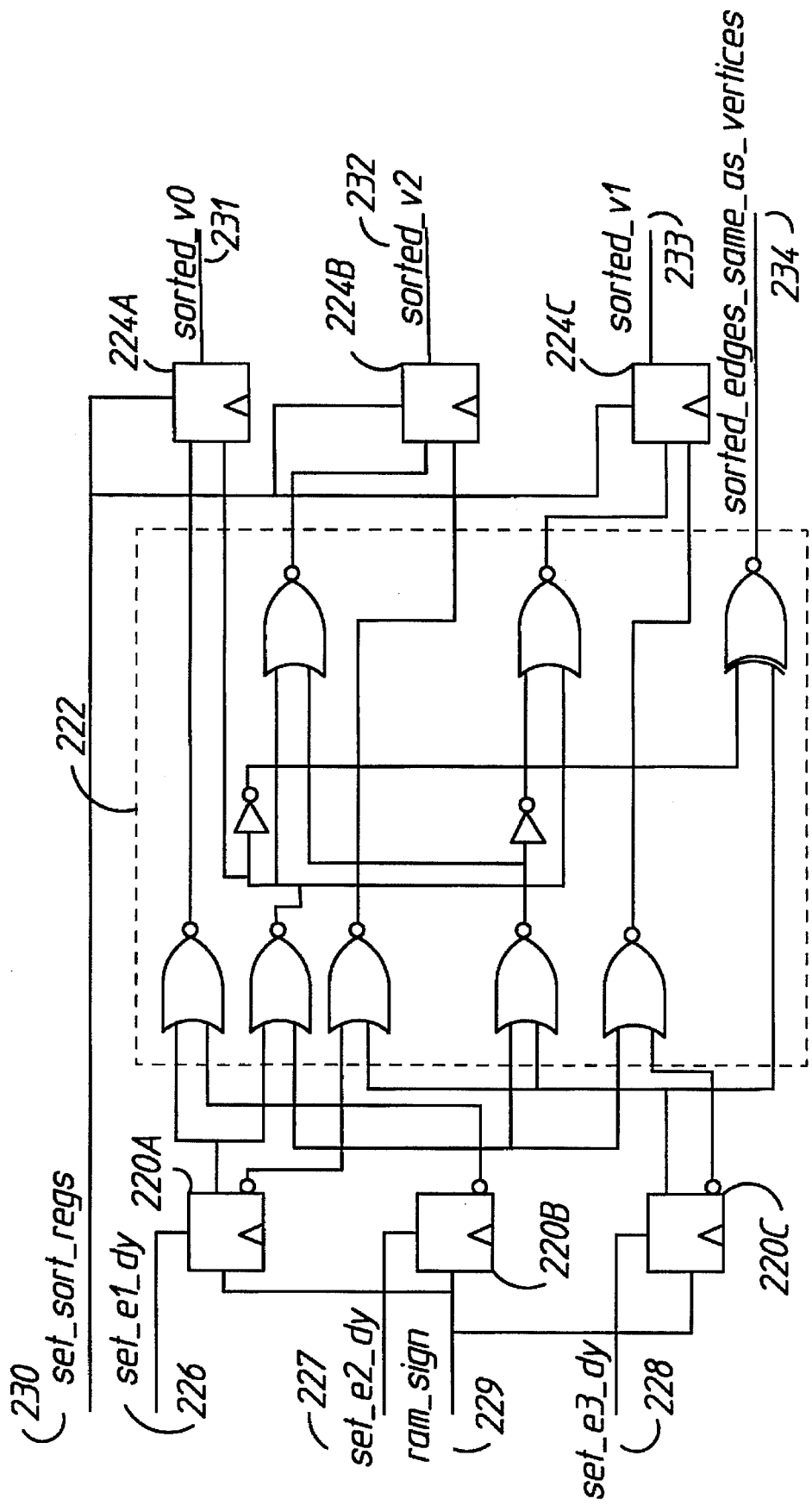
FIG. 14 shows an example of a circuit for performing vertex sorting in accordance with FIG. 13.

Simultaneous vertex sorting and plane equation generation may be performed by the processing unit shown in FIG. 3 and FIG. 14 and described above.

Typically, vertex sorting involves comparing the Y coordinate values of each pair of vertices to find the smallest to largest. However, the process of comparing these Y coordinate values may take extra computing cycles, which could instead be used to begin calculating plane equations. Instead, it should be noted that the Y sorting order is encoded in the edge delta Y's which are computed as part of the plane equations shown in FIG. 7 and the equations discussed earlier. Because the edge deltas consistently defined with respect to the vertices (see FIG. 5a and FIG. 5b), the sign of the edge delta Y's can be used to determine the sorting results.

Figure 12:
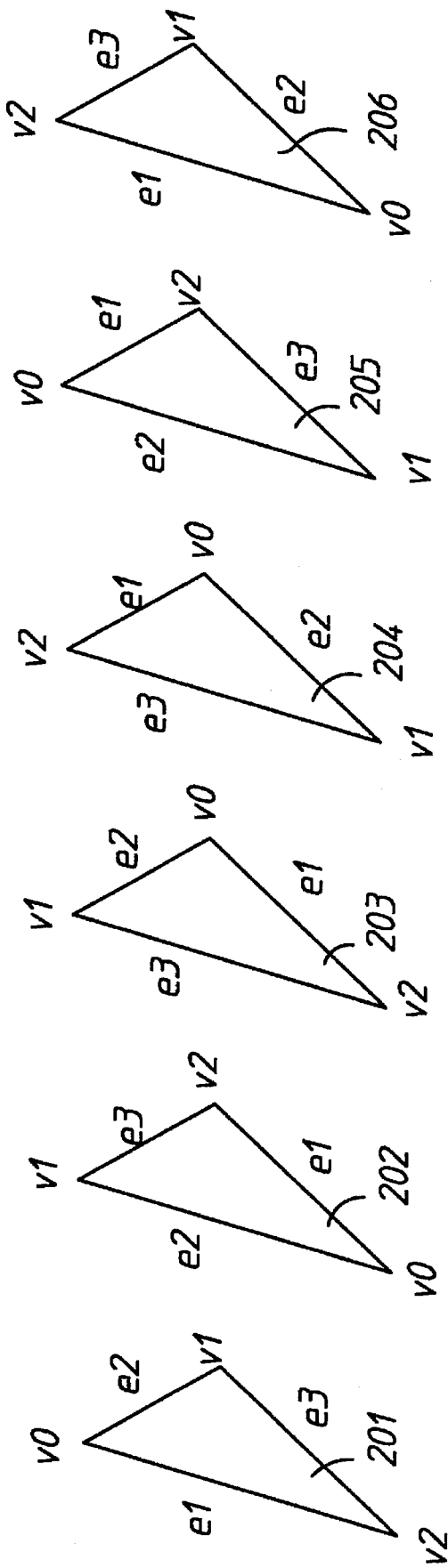
FIG. 12 shows several examples of triangles prior to vertex sorting.

FIG. 12 shows several examples of triangles having different sort results. For example, the triangle 201 does not require any sorting, because the edge and vertex notations are in accordance with the designations of FIGS. 5a and 5b. However, for triangle 203, note that vertex V1 has the smallest Y coordinate value, and thus must be swapped with vertex V0, in order to obtain the designations such as those of triangle 201.

FIG. 13 shows a truth table for performing the appropriate swapping of vertices and edges, for each of the examples in FIG. 12. As shown in FIG. 13, the sorted vertex order and the sorted edge order may be determined from the sign of edge delta dy for each of the edges. A "0" for "edge 3 DY sign", "edge 2 DY sign", and "edge 1 DY sign" indicates that the edge delta dy sign is positive, and a "1" indicates that the edge delta dy sign is negative. For example, for triangle 202, the edge 1 dy is positive (from vertex V0 to vertex V2), the edge 2 dy is negative (from vertex V1 to vertex V0), and the edge 3 dy is positive (from vertex V2 to vertex V1). The "sorted vertex order" refers to the order of the sorted vertices with respect to the original vertices. For example, in case (b), sorted vertex order is (2,0,1) meaning that the sorted vertex V2 is equal to the original vertex V0, the sorted vertex V0 is equal to the original vertex V1, and the sorted vertex V1 is equal to the original vertex V2. Similarly, the sorted edge order shows the order of the sorted edges with respect to the original edges.

As mentioned above with respect to FIG. 7 and the steps of generating the plane equations, the edge deltas are each defined in a direction so that the edge deltas have a consistent direction around the triangle. For triangle 202, the sorting is achieved by effectively rotating the vertices and edge designations clockwise. Accordingly, FIG. 13 shows the sorted vertex order and sorted edge order. FIG. 13 includes the resulting vertex order and edge order for each of the triangles 201–206 shown in FIG. 21. FIG. 13 also illustrates two additional cases not shown in FIG. 12. In particular, case (g) shows a case in which each edge has a positive edge delta, and case (h) shows a case in which each edge has a negative edge delta. With the definition of the edges as described above, such cases would not normally occur. However, if a triangle has been reduced in size so that the triangle has effectively been degenerated to a point, for example, it may be that all edge deltas are 0, in which case the sign of each of the edge deltas could be positive or negative. A similar situation may exist if a triangle were degenerated into a horizontal line. Accordingly, it is possible that the cases shown in (g) and (h) may exist. In these cases, no actual sorting is necessary because the vertices are all effectively equal. Therefore, the sorted vertex order and the sorted edge order, in these cases, may be the order that existed prior to any vertex sorting.

FIG. 14 shows one embodiment of a circuit for vertex sorting, which may be implemented as a portion of the plane equation calculation circuit shown in FIG. 3. The circuit is representative of the logic which may be used, and alternative implementations may be effectively implemented to achieve a similar purpose. The circuit includes input registers 220A, 220B and 220C, which hold the three edge Y delta signs which are received on the ram_sign signal 229. The outputs of the logic circuit 222 are provided to output registers 224A, 224B and 224C, which in turn provide the sorted signals, which are used in addressing the register file 180 of FIG. 3 in a manner shown in the address map of FIG. 16.

In operation, each of the input registers 220A, 220B, and 220C receives the ram_sign signal 229, which carries time-multiplexed data indicative of the sign of each of the edge deltas. Signal set_e1_dy on line 226 indicates that the ram_sign signal 229 holds the sign of the edge1 Y delta, signal set_e2_dy on line 227 indicates that the ram_sign signal 229 holds the sign of the edge2 Y delta, and signal set_e3_dy on line 228 indicates that the ram_sign signal 229 holds the sign of the edge3 Y delta. The edge Y delta sign signals are received from step 120 of FIG. 7, for example, in which each of the edge deltas was calculated. Logic circuit 222 performs logic manipulation in accordance with the logic shown in FIG. 13, in order to determine the sorted vertex order, and provides outputs to registers 224A–C. For example, output register 224A holds a 2-bit value representative of the vertex which is the sorted vertex V0, and provides as an output signal sorted_v0 on line 231. Output register 224B holds a 2-bit value representative of sorted vertex V2, and provides as an output signal sorted_v2 on line 232, and output register 224C holds the value for the sorted vertex V1 and provides as an output signal sorted_v1 on line 233. The signal set_sort_regs on line 230 may be used to latch the output registers 224A–C in order to hold the sorted vertex values. Additionally, logic circuit 222 provides another output, designated as signal sorted_edges_same_as_vertices on line 234, which may be used to indicate that the triangle did not switch type as a result of the sorting. (Refer to FIGS. 5a and 5b for triangle types I and II). The sorted edge numbers need not be provided by the circuit shown in FIG. 14, since the sorted edge numbers may be decoded from the sorted vertex signals on lines 231–233 and the sorted_edges_same_as_vertices signal 234.

With the outputs from the circuit shown in FIG. 14, a circuit as shown in FIG. 3 may be used to generate the sorted plane equations in one exemplary embodiment. In one embodiment, the outputs from FIG. 14 are used as pointers to the vertex data in the register file 180, thus avoiding any actual data swapping as a result of the sorting. FIG. 16 shows a memory map for the register file 180 which is used in this embodiment. In FIG. 16, the label 256 characterizes the values to be stored in register file 180 as being associated with either vertex V0, vertex V1, or vertex V2. Address 252 is the decimal address, while address 254 is a binary address corresponding to address 252. Area 256 defines the content of each of the addresses. For example, X, Y, Z, R, G, and B values are associated with each of the vertices. To access one of these values, the appropriate address is given. The first two digits of the binary address indicate which vertex is chosen (01 for vertex V0, 10 for vertex V1, and 11 for vertex V2), while the last three binary digits indicate the individual value for that vertex. In this manner, the first two digits may represent the sorted vertex. These two digits are output from signals 224A–C of FIG. 14, so that no relocation of the vertex data is required. Note that the vertex data in FIG. 16 also contains edge information, in particular the edge dx and edge dy for each of the three edges. With the arrangement shown in FIG. 16, these values may also be referenced from the output of the circuit shown in FIG. 14.

As indicated above, the circuit of FIG. 3 may also be used to perform fast quadrilateral generation. In performing sorted plane equation generation, the vertex and edge data may be read from RAM 196 and stored in register file 180, for fast access by the ALU 184, multiplier 186, and divider 188. Register file 180 stores the vertex data and edges at locations in the register file such that the 2-bit sorted vertex signals 224A–C can select the desired sorted vertex from the locations in register file 180. Additionally, a 3-bit field may be used to designate the appropriate parameter (for example X, Y, Z, Red, Green, Blue) of the desired sorted vertex. Thus, if sorted.v0.x is desired as an input to a calculation being performed, the data can be read from the register 180 by giving the register 180 an address which contains the 2-bit vertex designation and the 3-bit parameter designation.

Figure 15:
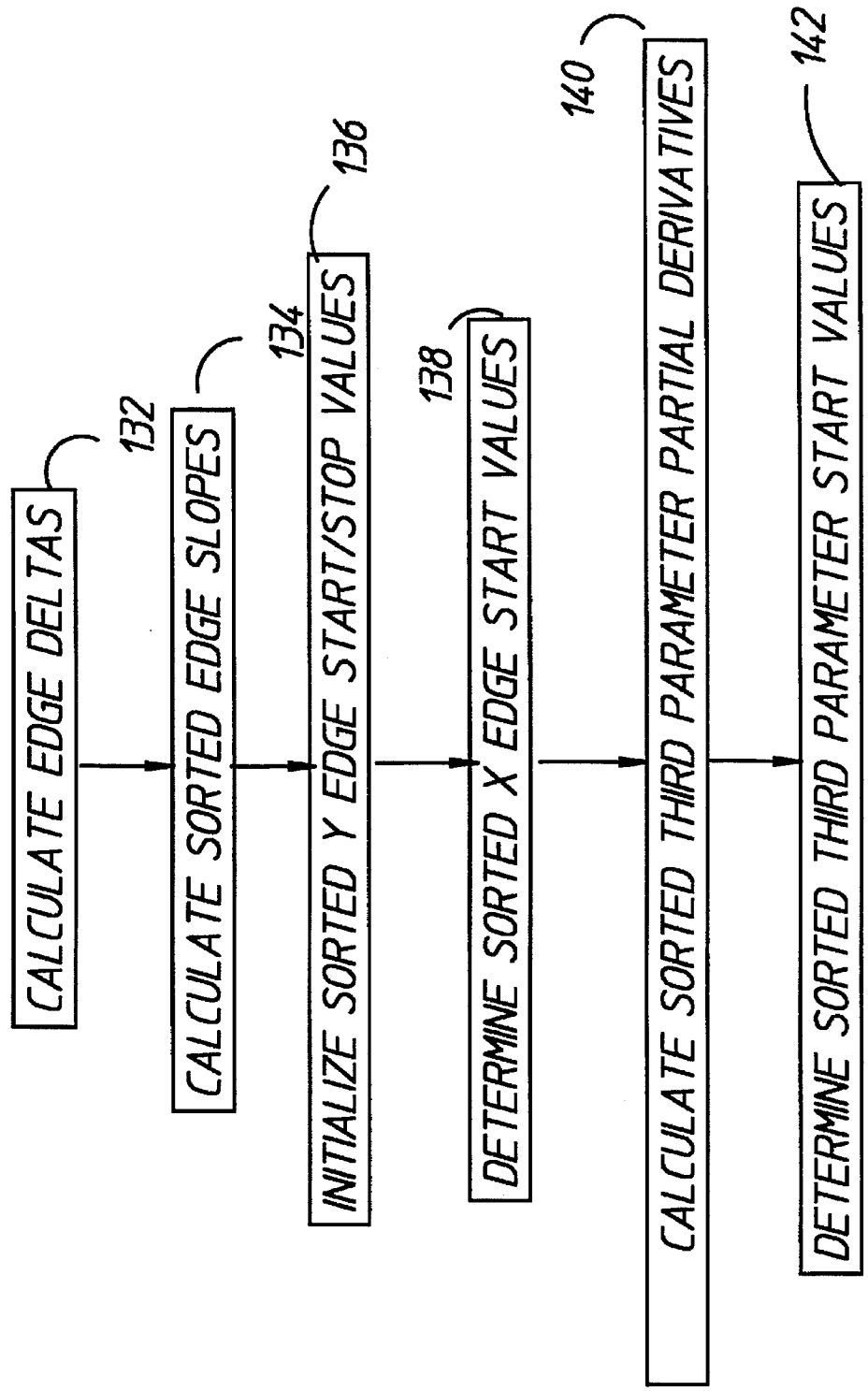
FIG. 15 shows a process in which vertex sorting is performed simultaneously with the plane equation generation.

FIG. 15 and the equations below show and describe the operations performed by the circuit of FIG. 3 in calculating plane equations with sorted parameter values. The operations need not be performed in the order shown in FIG. 15, and may overlap or be performed simultaneously. In the equations below the word "sorted" appearing in a variable name denotes the value after sorting. Thus, for example, if the original vertices are v0, v1 and v2 with v1.y, <v0.y<v2.y, then sorted.v0=v1, sorted.v1=v0, and sorted.v2=v2.

In step 132, the edge deltas are calculated in a manner similar to step 120 of FIG. 7. Therefore, each of the following values may be calculated prior to or during sorting: mnx2, nx1, dxe3, mny2, ny1, dye3, mnz2, nz1, mnred2, nred1, mngreen2, ngreen2, mnblue2, and nblue1.

$$mnx2 = v0 \cdot x - v2 \cdot x$$
$$nx1 = v1 \cdot x - v0 \cdot x$$
$$dxe3 = v2 \cdot x - v1 \cdot x$$

$$mny2 = v0 \cdot y - v2 \cdot y$$
$$ny1 = v1 \cdot y - v0 \cdot y$$
$$dye3 = v2 \cdot y - v1 \cdot y$$

$$mnz2 = v0 \cdot z - v2 \cdot z$$
$$nz1 = v1 \cdot z - v0 \cdot z$$

$$mnred2 = v0 \cdot red - v2 \cdot red$$
$$nred1 = v1 \cdot red - v0 \cdot red$$

$$mngreen2 = v0 \cdot green - v2 \cdot green$$
$$ngreen1 = v1 \cdot green - v0 \cdot green$$

$$mnblue2 = v0 \cdot blue - v2 \cdot blue$$
$$nblue = v1 \cdot blue - v0 \cdot blue$$

In step 134, the sorted edge slopes are calculated. This is distinguished from step 122 of FIG. 7, in which the edge slopes were calculated without sorting, since the process of FIG. 7 is dependent upon vertex data that was previously sorted. Accordingly, the sorted edge slopes may be calculated as shown below, using the outputs from the output registers 224A–C to determine the appropriate sorted vertices. The values below that are followed by an asterisk (*) are those values that are independent of sorting, and thus may be calculated prior to or during sorting.

$$edge1\_slope* = mnx2/mny2$$
$$edge2\_slope* = nx1/ny1$$
$$edge3\_slope* = dxe3/dye3$$

$$sorted \cdot e1\_slope = edge1\_slope \text{ or } edge3\_slope$$

-continued (depending upon sort)
sorted · e2_slope = edge1_slope or edge2_slope
(depending upon sort)
sorted · e3_slope = edge2_slope or edge3_slope
(depending upon sort)

For example, sorted.e1_slope is calculated to be the sorted V0 dx divided by the sorted V0 dy if the signal sorted_edges_same_as_vertices is active. Else, the sorted.e1_slope is calculated to be the sorted V2 dx divided by the sorted V2 dy (see FIG. 16 for designations of sorted vertex designations, where for example "V0 dx" designates edge1_dx). Similarly, the sorted.e2_slope is calculated to be the sorted V1 dx divided by the sorted V1 dy if the signal sorted_edges_same_as_vertices is active, and the sorted V0 dx divided by the sorted V0 dy otherwise. Also, the sorted.e3_slope is calculated to be the sorted V2 dx divided by the sorted V2 dy if the signal sorted_edges_same_as_vertices is active, and the sorted V1 dx divided by the sorted V1 dx otherwise.

In step 136, the sorted Y edge start/stop values are determined. Since the sorted vertices are known, the start/stop values may be determined directly from the sorted vertices.

edge1_y_start = sorted · v0 · y
edge1_y_stop = sorted · v2 · y
edge3_y_start = sorted · v1 · y The X edge starts may then be calculated (step 138) with equations similar to those of step 126 of FIG. 6, but using the sorted values instead.

frac_y0 = roundup(sorted · v0 · y) − sorted · v0 · y
frac_y1 = roundup(sorted · v1 · y) − sorted · v1 · y edge1_x_start = sorted · v0 · x + sorted · e1_slope * frac_y0
edge2_x_start = sorted · v0 · x + sorted · e2_slope * frac_y0
edge3_x_start = sorted · v1 · x + sorted · e3_slope * frac_y1

In step 140, the partial derivatives for Z and any colors are determined, if depth and/or color is desired. It may be noted that several of the equations below are not dependent upon triangle sorting, and thus may be performed in any order with respect to when the sorting circuit performed the sort. For example, all of the partial derivatives except those along edge one are independent of sort. The x_increment value, as described above, depends upon the sort because the sign of the cross product represented by x_increment will be opposite with a sorting that changed the type of triangle (from type I to II or from II to I). Accordingly, if sorted_edges_same_as_vertices signal 234 is active, then x_increment is as discussed earlier. However, if sorted_edges_same_as_vertices signal 234 is not active, this is indicative of a type switch, and the signal for x_increment will be negated.

$$\text{one\_over\_cd}^* = \frac{1.0}{mny2 * nx1 - mnx2 * ny1}$$

x_increment = [sign(one_over_cd) if sorted_edges_same_as_vertices]

[−sign(one_over_cd)else]

e1_slope = truncate(sorted · e1_slope)

dz/dx* = (mny2 * nz1 − mnz2 * ny1) * one_over_cd
dz/dy* = (mxz2 * nx1 − mnx2 * nx1) * one_over_cd
dz/de1 = dz/dy + dz/dx * e1_slope dred/dx* = (mny2 * nred1 − mnred2 * ny1) * one_over_cd
dred/dy* = (mnred2 * nx1 − mnx2 * nred1) * one_over_cd
dred/de1 = dred/dy + dred/dx * e1_slope -continued dgreen/dx* = (mny2 * ngreen1 − mngreen2 * ny1) * one_over_cd
dgreen/dy* = (mngreen2 * nx1 − mnx2 * ngreen1) * one_over_cd
dgreen/de1 = dgreen/dy + dgreen/dx * e1_slope dblue/dx* = (mny2 * nblue1 − mnblue2 * ny1) *one_over_cd
dblue/dy* = (mnblue2 * nx1 − mnx2 * nblue1) * one_over_cd
dblue/de1 = dblue/dy + dblue/dx * e1_slope Next, the sorted Z and color starts are calculated, adjusted from the vertex to the first pixel drawn (step 142).

frac_x0 = [roundup(edge1_x_start) − sorted · v0 · x
(if x_increment = 1)]
[rounddown(edge1_x_start) − sorted · v0 · x
(if x_increment = 0)]

z_start = sorted · v0 · z + dz/dy * frac_y0 + dz/dx * frac_x0
red_start = sorted · v0 · red + dred/dy * frac_y0 + dred/dx * frac_x0
green_start = sorted · v0 · green + dgreen/dy * frac_y0 + dgreen/dx*frac_x0 blue_start = sorted · v0 · blue + dblue/dy * frac_y0 + dblue/dx *frac_x0

As a result, vertex sorting may be performed quicker and with less processing resources than may otherwise be required. For example, since the edge Y deltas are already to be calculated for the plane equation generation, these deltas may be used as a basis for comparison to perform the vertex sorting, instead of performing several comparisons of the Y coordinate values of each vertex. Since each edge Y deltas has a sign that indicates whether the Y axis is increasing with respect to that edge in accordance with a consistent edge designation, a logic circuit may be used to quickly sort the vertices to provide sorted vertices.

Additionally, the entire sorting step is effectively transparent with respect to the plane equation generation. Instead of performing a sort operation and then calculating plane equations based on the results of the sorting operation, the plane equations may be generated in effectively a single step.

Simultaneous sorting may be performed in either hardware as shown in FIG. 3, in software, or as a combination of hardware and software.

Having thus described several particular embodiments of the invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. In a computer graphics system, apparatus for generating pixel data representative of a triangle, comprising:

a processing circuit for generating plane equation data in response to vertex data representative of a triangle, said processing circuit comprising:

means responsive to said vertex data for generating a first portion of said plane equation data;

means responsive to said first portion of said plane equation data for sorting said vertex data in accordance with a sorting criteria that facilitates calculations of said plane equation data to provide sorted vertex data;

means responsive to said sorted vertex data for generating a second portion of said plane equation data following sorting of said vertex data; and a fill scan converter responsive to the first and second portions of said plane equation data for generating pixel data representative of said triangle.

2. The apparatus of claim 1, wherein the fill scan converter generates pixel data for a display that includes a first axis and a second axis, and wherein said first portion of said plane equation data includes:

means for generating a first edge delta representing a difference in first axis coordinate values along a first edge of the triangle, the first edge delta having a first sign;

means for generating a second edge delta representing a difference in first axis coordinate values along a second edge of the triangle, the second edge delta having a second sign; and means for generating a third edge delta representing a difference in first axis coordinate values along a third edge of the triangle, the third edge delta having a third sign.

3. The apparatus of claim 2, wherein the means for sorting includes a logic circuit that determines said sorted vertex data from the first sign, the second sign, and the third sign.

4. The apparatus of claim 3, wherein the processing circuit further includes a register file that stores the vertex data, and wherein the logic circuit provides sorted addresses that reference the vertex data stored in the register file to thereby provide the sorted vertex data.

5. The apparatus of claim 2, wherein the means for sorting includes means for determining said sorted vertex data from the first sign, the second sign, and the third sign.

6. The apparatus of claim 5, wherein the processing circuit includes a register file that stores the vertex data, and wherein the means for determining said sorted data includes means for providing sorted addresses that reference the vertex data stored in the register file to thereby provide the sorted vertex data.

7. The apparatus of claim 1, wherein the processing circuit includes a register file that stores the vertex data, and wherein the means for sorting includes means for providing sorted addresses that reference the vertex data stored in the register file to thereby provide the sorted vertex data.

8. The apparatus of claim 7, wherein the sorted addresses each includes a first part that references a display parameter of one of the vertices, and a second part that references the sorted vertex.

9. In a computer graphics system including a fill scan converter for generating pixel data representative of a triangle in response to plane equation data, a method for generating the plane equation data comprising the steps of:

receiving vertex data that describes the triangle;

generating a first portion of the plane equation data using the vertex data, the first portion of the plane equation data being independent of whether the vertex data is sorted;

sorting the vertex data based upon the first portion of the plane equation data to generate sorted vertex data;

generating a second portion of the plane equation data using the sorted vertex data; and providing the first portion and the second portion of the plane equation data to the fill scan converter.

10. The method of claim 9, wherein the fill scan converter generates pixel data for a display that includes a first axis and a second axis, and wherein the step of generating a first portion of the plane equation data includes the steps of:

generating a first edge delta representing a difference in first axis coordinate values along a first edge of the triangle, the first edge delta having a first sign;

generating a second edge delta representing a difference in first axis coordinate values along a second edge of the triangle, the second edge delta having a second sign; and generating a third edge delta representing a difference in first axis coordinate values along a third edge along the triangle, the third edge delta having a third sign.

11. The method of claim 10, wherein the step of sorting includes determining the sorted vertex data from the first sign, the second sign, and the third sign.

12. The method of claim 11, wherein the step of receiving vertex data includes storing the vertex data in a register file, and wherein the step of sorting includes generating sorted addresses data that reference the vertex data stored in the register file to thereby provide the sorted vertex data.

13. The method of claim 9, wherein the step of receiving vertex data includes storing the vertex data in a register file, and wherein the step of sorting includes generating sorted addresses that reference the vertex data stored in the register file to thereby provide the sorted vertex data.

14. The method of claim 13, wherein the step of generating sorted addresses includes generating a first part that references a display parameter of one of the vertices, and a second part that references the sorted vertex.

15. In a computer graphics system including a fill scan converter for generating pixel data representative of a triangle in response to plane equation data, an apparatus for generating the plane equation data comprising:

means for receiving vertex data that describes the triangle;

means for generating a first portion of the plane equation data using the vertex data, the first portion of the plane equation data being independent of whether the vertex data is sorted;

means for sorting the vertex data based upon the first portion of the plane equation data, to generate sorted vertex data;

means for generating a second portion of the plane equation data using the sorted vertex data; and means for providing the first portion and the second portion of the plane equation data to the fill scan converter.

16. The apparatus of claim 15, wherein the fill scan converter generates pixel data for a display that includes a first axis and a second axis, and wherein the means for generating a first portion of the plane equation data includes:

means for generating a first edge delta representing a difference in first axis coordinate values along a first edge of the triangle, the first edge delta having a first sign;

means for generating a second edge delta representing a difference in first axis coordinate values along a second edge of the triangle, the second edge delta having a second sign; and means for generating a third edge delta representing a difference in first axis coordinate values along a third edge of the triangle, the third edge delta having a third sign.

17. The apparatus of claim 16, wherein means for sorting includes means for determining the sorted vertex data from the first sign, the second sign, and the third sign.

18. The apparatus of claim 17, wherein the means for receiving vertex data includes means for storing the vertex data in a register file, and wherein the means for sorting includes means for generating sorted addresses that references the vertex data stored in the register file, to thereby provide the sorted data.

19. The apparatus of claim 15, wherein the means for receiving vertex data includes means for storing the vertex data in a register file, and wherein the means for sorting includes means for generating sorted addresses that reference the vertex data stored in the register file, to thereby provide the sorted data.

20. The apparatus of claim 19, wherein the means for generating sorted addresses includes means for generating a first part that references a display parameter of one of the vertices, and a second part that references the sorted vertex.

* * * * *